United States Patent
Niakan et al.

[11] Patent Number: 5,941,503
[45] Date of Patent: Aug. 24, 1999

[54] VALVE ASSEMBLY

[75] Inventors: Shahriar Niakan, Woodland Hills; Yuhung Edward Yeh, Tarzana, both of Calif.

[73] Assignee: Emhart Inc., Newark, Del.

[21] Appl. No.: 09/089,966

[22] Filed: Jun. 3, 1998

Related U.S. Application Data

[62] Division of application No. 08/632,049, Apr. 15, 1996.

[51] Int. Cl.$^6$ ............................. F16K 41/00; F16K 3/36
[52] U.S. Cl. ....................... 251/214; 251/208; 251/285; 251/288; 251/355
[58] Field of Search .................... 251/214, 208, 251/285, 288, 355

[56] References Cited

U.S. PATENT DOCUMENTS

| | | | |
|---|---|---|---|
| 2,567,527 | 9/1951 | Parks | 251/214 X |
| 2,805,040 | 9/1957 | Voss | 251/214 |
| 2,935,293 | 5/1960 | Monson | 251/288 X |
| 3,338,549 | 8/1967 | Anthes et al. | 251/214 X |
| 3,433,264 | 3/1969 | Parkison | 137/625.17 |
| 3,633,870 | 1/1972 | Bayer | 251/355 X |
| 3,696,710 | 10/1972 | Ortelli | 137/625.21 X |
| 3,810,602 | 5/1974 | Parkinson | 251/304 |
| 3,831,621 | 8/1974 | Anthony et al. | 137/270 |
| 4,005,728 | 2/1977 | Thorp | 251/288 X |
| 4,205,822 | 6/1980 | Bernat | 251/208 |
| 4,285,498 | 8/1981 | Nightingale | 251/214 |
| 4,331,176 | 5/1982 | Parkison | 137/454.5 |
| 4,453,567 | 6/1984 | MacDonald | 137/625.17 X |
| 4,793,375 | 12/1988 | Marty | 137/270 |
| 4,899,982 | 2/1990 | Lange | 251/214 |
| 4,946,134 | 8/1990 | Orlandi | 251/208 |
| 4,966,191 | 10/1990 | Azizi | 137/625.17 |
| 5,058,860 | 10/1991 | Grassberger | 251/208 |
| 5,176,168 | 1/1993 | Stoll et al. | 251/355 X |
| 5,332,003 | 7/1994 | Nikolayczik | 137/625.17 |
| 5,372,161 | 12/1994 | Bechte | 137/625.17 |
| 5,398,717 | 3/1995 | Goncze | 137/270 |
| 5,402,827 | 4/1995 | Gonzalez | 137/625.17 |
| 5,564,678 | 10/1996 | Watson | 251/208 |

FOREIGN PATENT DOCUMENTS

| | | | |
|---|---|---|---|
| 320865 | 4/1957 | Switzerland | 251/285 |

*Primary Examiner*—John Rivell
*Attorney, Agent, or Firm*—Harold Weinstein

[57] ABSTRACT

A non-riser valve assembly 30 includes a bonnet or housing 32, a bushing 34, a stem 36, a washer 38 and a stop 40. The assembly 30 further includes a coupling 42, a rotatable or movable disk 44, a fixed disk 46 and a bottom seal 48. In assembly, the bushing 34 and the stem 36 are located within an opening 50 of the housing 32 with the bushing being located between the housing and the stem. One of the stem 36 extends from one end of the opening 50 and the stop 40 is removably attached to the stem to limit the rotational movement of the stem within the housing. The coupling 42 is located in the opening 50 of the housing 32 and is in driving engagement with the opposite end of the stem 36. The movable disk 44 is located with the opening 50 and is coupled to the coupling 42 for rotation therewith. The fixed disk 46 is attached to the housing 32 within the opening 50 and is formed with a surface 224 which is in water-sealing engagement with a surface 162 of the movable disk 44. The disks 44 and 46 are formed with passages 164 and 218, respectively, the relative positioning of which is controlled by rotation of the stem 36 to control the flow of water therethrough.

9 Claims, 17 Drawing Sheets

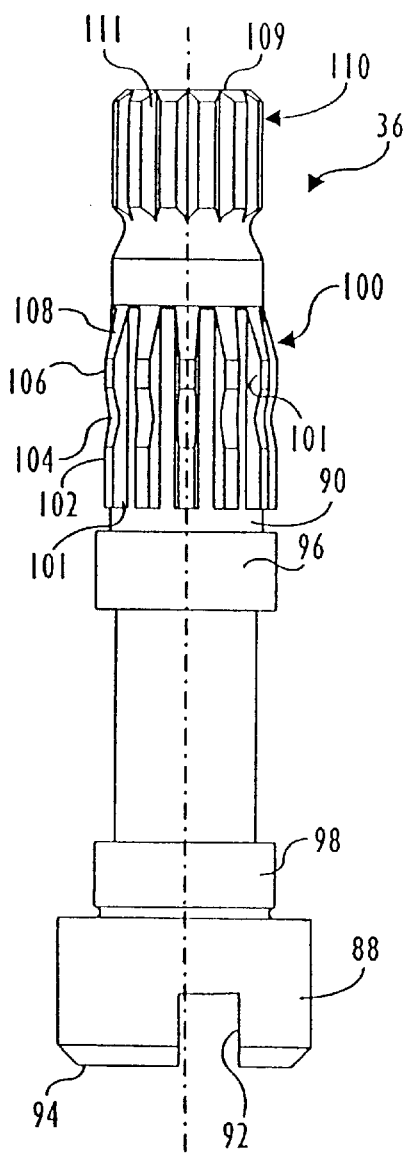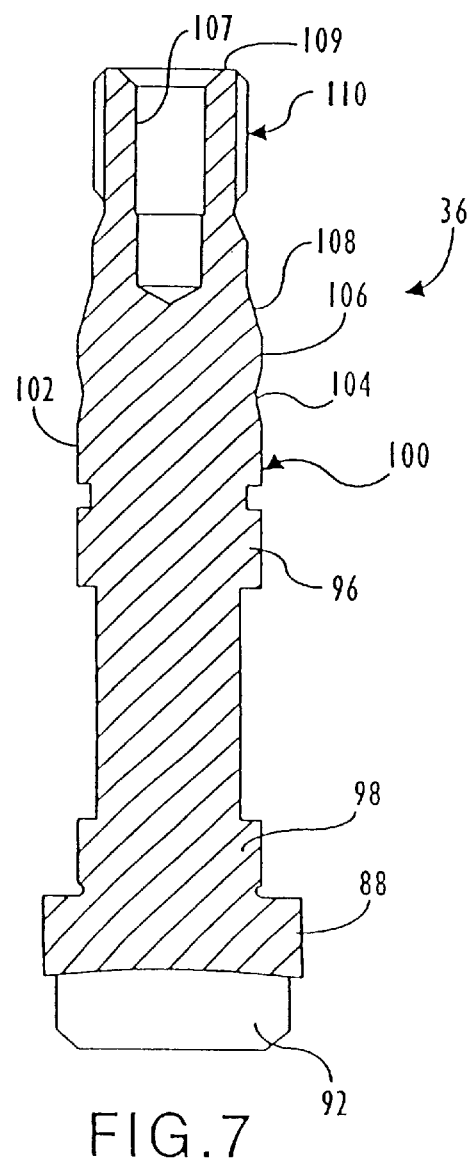
FIG. 6
FIG. 7

VALVE ASSEMBLY

This application is a division of application Ser. No. 08/632,049, filed Apr. 15, 1996 (pending).

BACKGROUND OF THE INVENTION

This invention relates to a valve assembly and particularly relates to a non-rise valve assembly.

Valve assemblies which are used with showers and tub arrangements may use a two-handle system for controlling the selective flow of hot and cold water. In such a system, the hot and cold handles are connected to respective valve assemblies which are located within an in-wall body. The in-wall body is typically cast or formed as an integral unit which includes two spaced end bodies containing the valve assemblies, a center body between the end bodies, and in-wall conduits which couple the center body to the end bodies. The center body is coupled to a showerhead and a tub spout through linking conduits.

In the two-handle system as described above, hot and cold water is supplied to respective end bodies where, upon selective control of the valve assemblies, water flows through the valve assemblies. The water continues to flow through the in-wall conduits, the center body, and through either the showerhead or the spout, and the linking conduit coupled thereto, depending on the selective position of a fluid diverter associated with the system.

In one type of valve assembly which has been used in the past, and continues to be used today, a washer is assembled at the base of a stem of the valve. The stem is threadedly mounted within a housing or bonnet of the valve so that, upon rotation of the stem, the stem is moved axially to either move the washer into sealing engagement with a seat of the housing to close the valve or to move the washer away from the seat to open the valve. This is referred to as a riser type of valve because the stem moves axially out of the housing or bonnet.

Another type of valve used in a two-handle faucet is a non-rise valve and employs two ceramic disks which are always in interfacing engagement and which are formed with openings to facilitate the flow of water therethrough. When the openings of the disks are not aligned in any respect, the valve is closed to prevent the flow of water therethrough. When the valve handle and associated stem are turned, one of the disks which is attached to the stem is rotated relative to the other disk while the two disks remain in interfacing engagement. Eventually, the openings of the disks are aligned and water is allowed to flow through the openings and out of the spout. In this type of valve, the stem of the valve does not move axially as the valve is opened, in contrast to the valve with the threadedly mounted stem noted above. A few examples of the many valves of the ceramic type are disclosed in U.S. Pat. Nos. 3,780,758; 3,831,621 and 5,174,324.

In a two-handle valving arrangement of the type described above, the valves typically are located in spaced relation to each other with one valve referred to as the left side valve for controlling the supply of hot water, and the other valve referred to as the right side valve for controlling the supply of cold water.

Generally, in ceramic valves of this type, the stem is freely rotatable within the bonnet in a clockwise direction and a counterclockwise direction. Therefore, a given design of a ceramic valve could be used on both sides of a two-handle faucet, that is as a right side valve and as a left side valve to provide the turning direction typically associated with a cold-water valve on the right side of the faucet and a hot water valve on the left side of the faucet. However, a turning limit stop must be employed to limit the turning of the valve in each direction to one-half of a full turn. In order to take advantage of the premise of using ceramic valves of a common design in both valves of a shower and tub arrangement, a reversible stop is used with each valve to limit the turning of the stem in one direction or the other depending on whether the valve is being used on the right side or the left side of the faucet. An example of a reversible stop which is used for this purpose is disclosed in U.S. Pat. No. 3,831,621.

When assembling the components of a ceramic valve of the type noted above, it is critical that the components be assembled in the proper relationship and orientation, otherwise the valve will not function in the manner intended. Typically, the components of the valves are assembled in a factory to form the valves. During the assembly process, the reversible stops are assembled so that each valve is either a hot water or a cold water valve and the valves are segregated accordingly. A hot water valve is then assembled into one of the pair of spaced end bodies on opposite ends of the in-wall body which is to the left of a center body thereof. A cold water valve is then assembled into the other end body which is to the right of the center body. The in-wall body with the valve assemblies is packaged and shipped, eventually, to an installation site where it is installed in a plumbing system. Thus, it is important that some provision be made to insure that the reversible stop is assembled in the proper manner to provide a hot water or a cold water valve so that, when that valve is assembled with the in-wall body, it is assembled in the appropriate end body thereof.

During the period immediately following the assembly of the components of the valve, the valve is transported within the factory to various stations for further processing. Also, individual valves may be packaged and sold as replacement units for installation with existing, previously installed shower and tub arrangements.

Current techniques and facilities for retaining the assembled reversible stop with the valve assembly, typically include elements which require tools to insert and remove the stop. This requires that the installer carry appropriate tools necessary for such actions. In the factory as well as at the installation site, provision must be made for retaining the reversible stop of the valve in assembly during periods of handling, shipment, storage, and ultimate assembly with other elements of the shower and tub arrangement at the factory or installation sites. In addition, provision must be made for facilitating easy removal of the stop.

With respect to the valves which are installed as replacements in existing shower and tub arrangements, provision must be made to insure that, when replacing a hot water valve or a cold water valve, the reversible stop is assembled in the appropriate manner for the valve to function accordingly. Of course, the same provision must be made to insure the appropriate assembly in the factory.

At times, a homeowner may wish to convert a shower and tub arrangement from a knob-handle unit to a lever-handle unit. In this instance, only the knobs are removed and replaced by levers. When only knobs are used, the reversible stops are situated within the valve assembly in a precise manner to accommodate the conventional turning for the hot and cold water valves in the same direction, that is clockwise to close for both the hot and cold water valves. When levers are used, the hot and cold levers extend in generally opposite directions from each other when the valve is fully closed.

When opening the lever-operated valves, the hot and cold valves are conventionally turned in opposite directions. For example, the cold lever is turned in a clockwise direction and the hot lever is turned in a counterclockwise direction to open the valve. Thus, to open the cold water valve for the knob assembly, the knob is turned in a counterclockwise direction, while to open the cold water valve for the lever assembly, the lever is turned in a counterclockwise direction. Therefore, provision must be made for easily reversing the cold water valve assembly when converting from a knob assembly to a lever assembly, or vice versa, and for insuring that the reversible stop is properly oriented to accommodate such change.

As noted, ceramic valves include two ceramic disks which are always in interfacing contact. Each disk is formed with an opening where, when aligned at least partially with the opening of the other disk, water will flow through the openings of the two disks. If the openings of the disks are designed to allow large amounts of water to flow when the valve is turned on or off, loud and undesirable noises, known as "water hammering," can develop because large amounts of water are suddenly trying to flow or cease flowing in a relatively short period of time. Also, the configurations of the openings can affect the temperature and flow resolution of the water mix which is passing through the openings. Thus, provision must be made for essentially eliminating the water hammering noise and for providing an excellent temperature and water flow resolution.

In valves of this type, the stem is rotatable within a bore of the bonnet. Due to the structural nature of these two elements, there is a tendency for the elements to wobble relative to each other. Also, there is a tendency for the elements to bind. Thus, provision must be made for minimizing any back lash or wobbling between the stem and the bonnet while insuring that the stem rotates relative to the bonnet with relative ease.

In view of the above-noted provisions, there is a need for a valve assembly which can be assembled in an efficient manner while insuring that a reversible stop thereof is properly assembled for the valve to function in the intended manner. In addition, there is a need for facilities which provide for the easy assembly and disassembly of the reversible stop. Further, there is a need for controlling the water flow through openings in the ceramic disks to facilitate avoidance of any hammering noise and to insure excellent temperature and water flow resolution. Also, there is a need for facility to minimize wobbling between the stem and the bonnet and to insure that the stem moves with ease relative to the bonnet.

SUMMARY OF THE INVENTION

In view of the foregoing needs, it is an object of this invention to provide a valve assembly having facility for insuring that components of the valve are assembled in an intended manner for proper operation thereof.

Another object of this invention is to provide a valve assembly having facility for insuring that components of the valve assembly may be easily assembled and disassembled.

Still another object of the invention is to provide for easy and comfortable operation of the valve assembly while providing necessary stability between moving parts thereof.

A further object of the invention is to provide flow passages which provide for excellent water temperature and water flow resolution while essentially preventing water hammering.

With these and other objects in mind, this invention contemplates a valve assembly which includes a housing and a stem mounted within the housing for free rotation relative thereto. A first-end of the stem extends from a first opening of the housing. A first fluid-flow valve element is located within the housing and is coupled to a second end of the stem for rotation therewith. The first valve element is formed with a surface which is in facing engagement with a first surface of a second fluid-flow valve element fixedly attached within and to the housing adjacent a second end of the housing. A stop element is assembled on the first end of the stem and is retained the assembled position by complementary structure formed on the stem and the stop element.

This invention further contemplates a valve assembly which includes a housing and a stem mounted within the housing for free rotation relative thereto. A first fluid-flow valve element is located within the housing and is coupled to an end of the stem for rotation therewith. The first valve element is formed with a surface which is in facing engagement with a surface of a second fluid-flow valve element fixedly attached within and to the housing adjacent a second end of the housing. The first and second valve elements are each formed with fluid flow openings which, when aligned, will allow fluid to flow therethrough. The opening of the first valve element is formed to restrict the flow of fluid initially to a limited level and thereafter to allow the flow level to gradually increase to full level.

Still another object of this invention contemplates a valve assembly which includes a housing and a stem mounted within the housing for free rotation relative thereto. An intermediate element is interposed between the housing and the stem to enhance the stable rotation between the housing and the stem.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 6 is a side view showing structural features of a stem of the valve assembly of FIG. 1 in accordance with certain principles of the invention;

FIG. 7 is a sectional view showing the stem of FIG. 6 in accordance with certain principles of the invention;

DESCRIPTION OF THE PREFERRED EMBODIMENT

Figure 1:
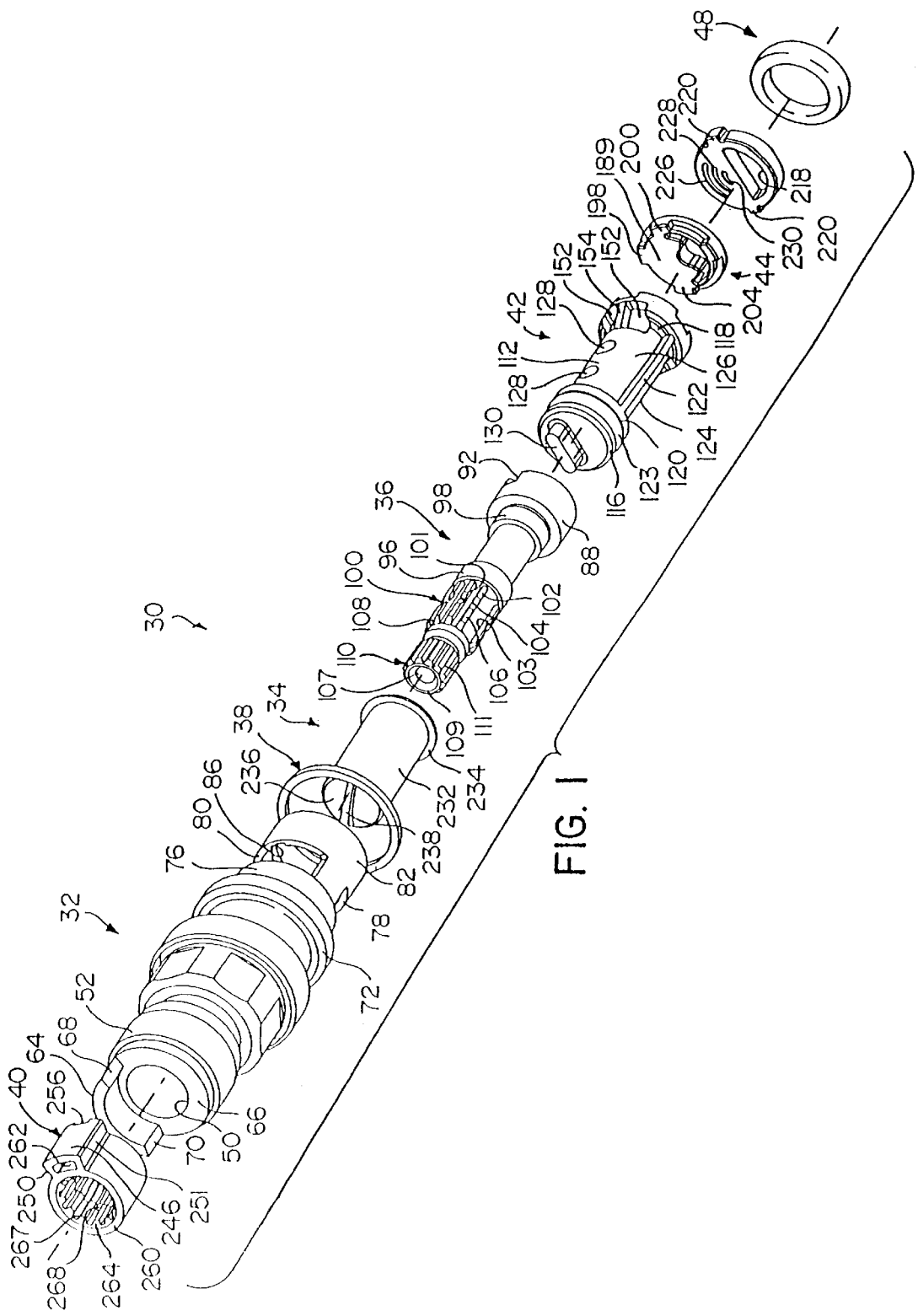
FIG. 1 is an exploded perspective view showing a valve assembly in accordance with certain principles of the invention.

As shown in FIG. 1, a non-riser valve assembly 30 includes a bonnet or housing 32, a bushing 34, a stem 36, a washer 38 and a stop 40. The assembly 30 further includes a coupling 42, a rotating or movable disk 44, a fixed disk 46 and a bottom seal 48. A valve of this type can be used with a two-handle faucet (not shown) for controlling the separate selection of the volume of hot and cold water to be supplied to, mixed in and passed through the faucet. Also, the valve assembly 30 has been designed for use with a faucet system which allows a half-turn, that is, a turn of one-hundred and eighty degrees, of the stem 36 of each valve assembly within defined limits.

Figure 2:
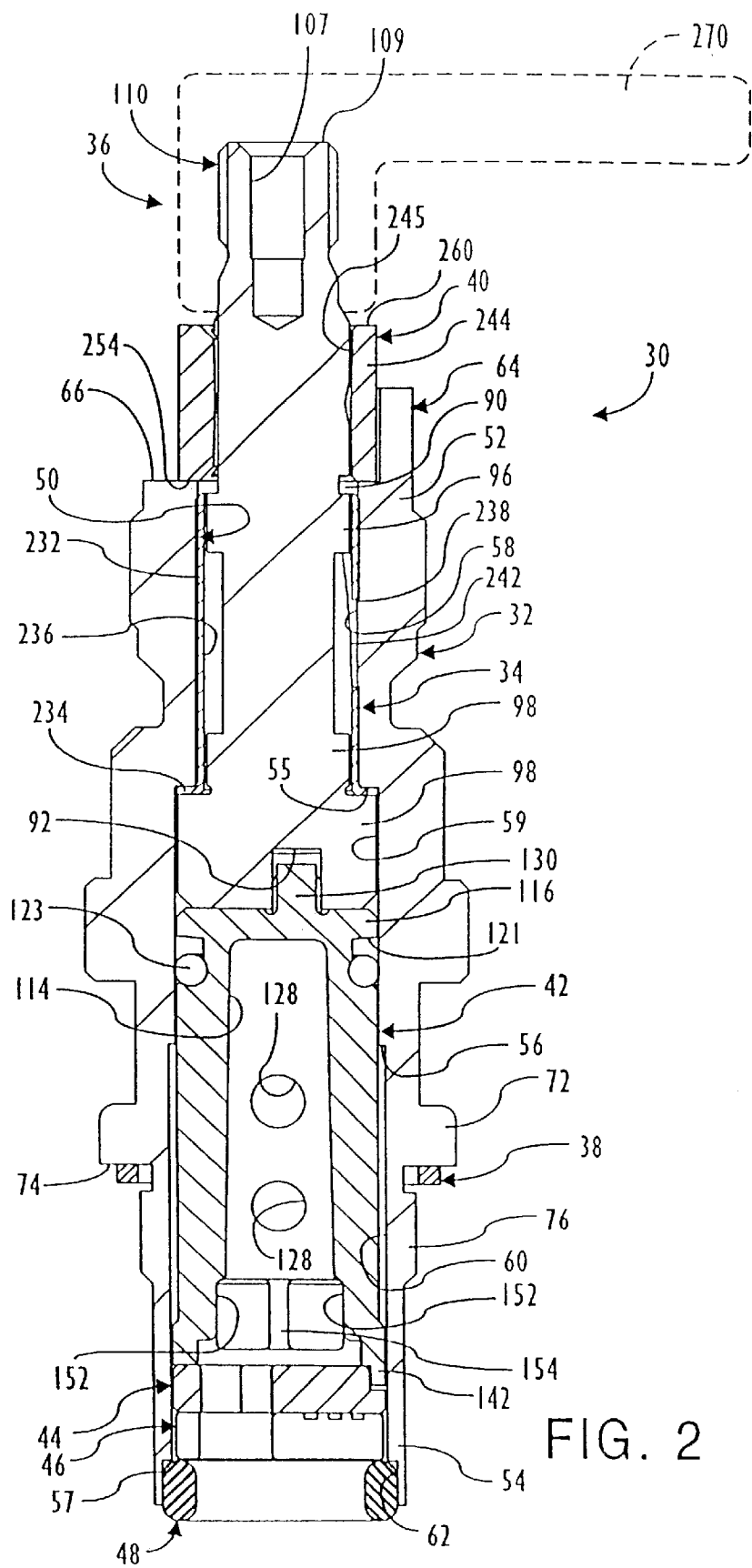
FIG. 2 is a side view showing structural features of the valve assembly of FIG. 1 in accordance with certain principles of the invention.
Figure 3:
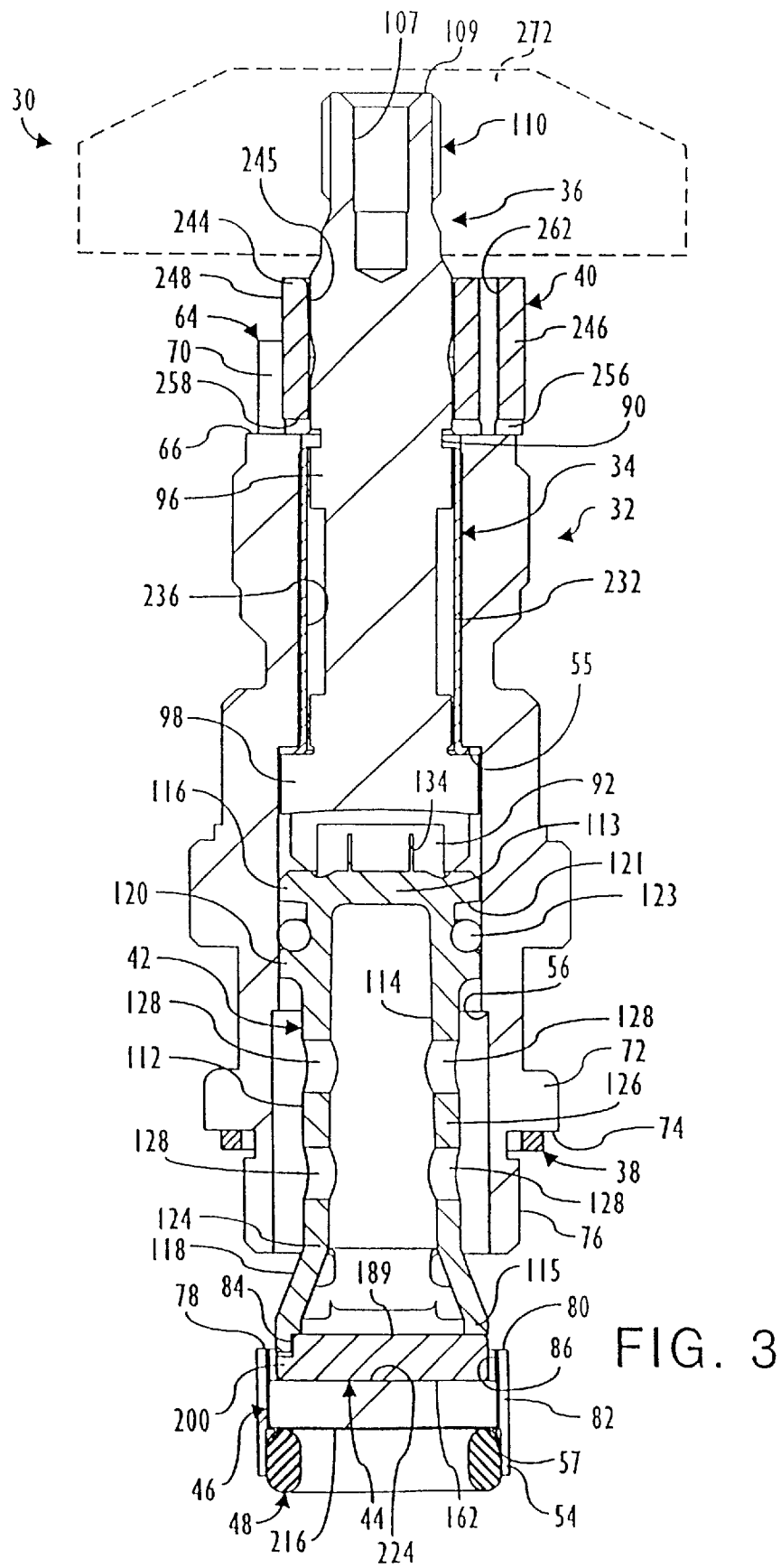
FIG. 3 is a side view rotated, ninety degrees from the side view of FIG. 2, showing structural features of the valve assembly of FIG. 1 in accordance with certain principles of the invention.
Figure 4:
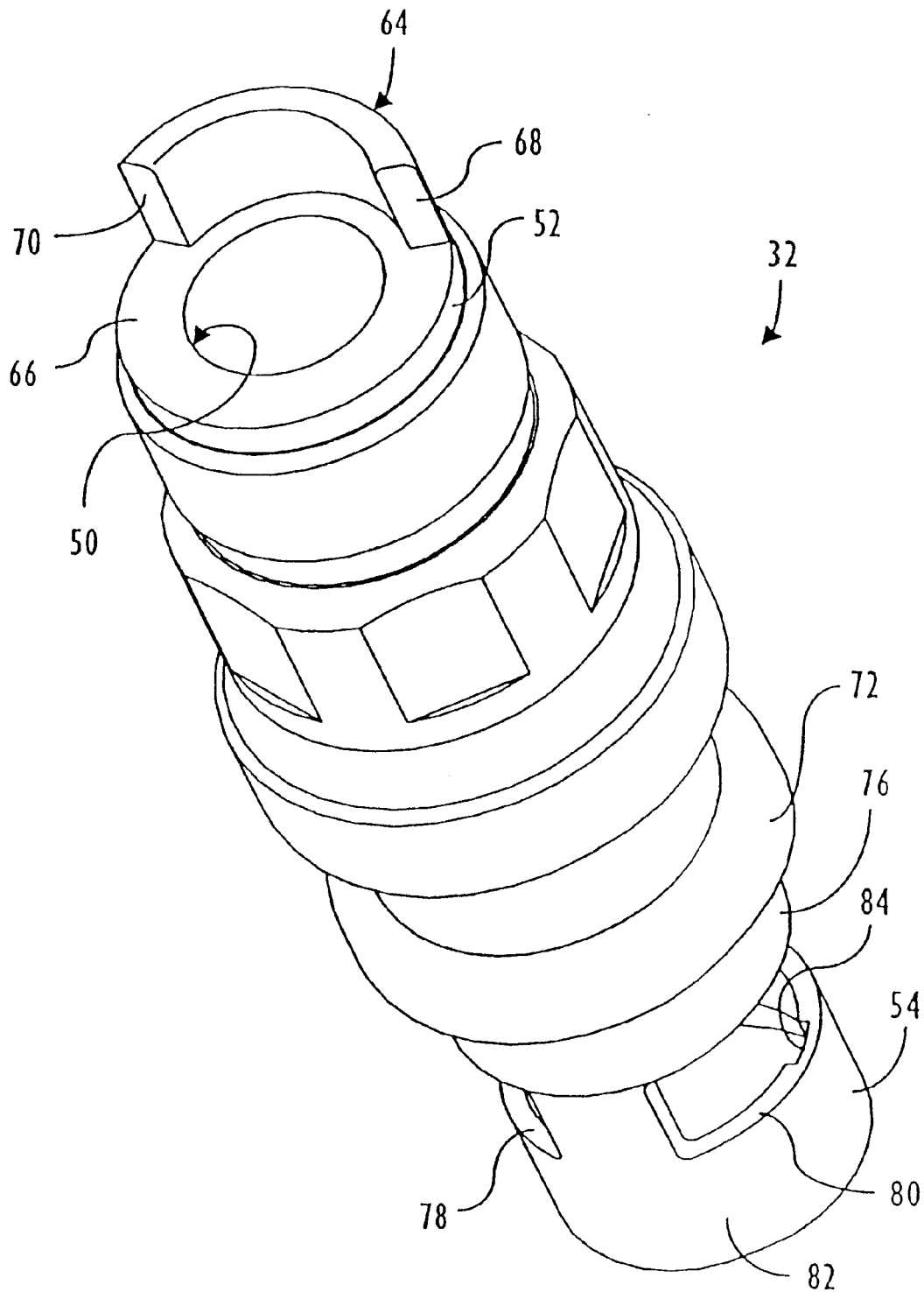
FIG. 4 is a perspective view showing structural features of a housing or bonnet of the valve assembly of FIG. 1 in accordance with certain principles of the invention.
Figure 5:
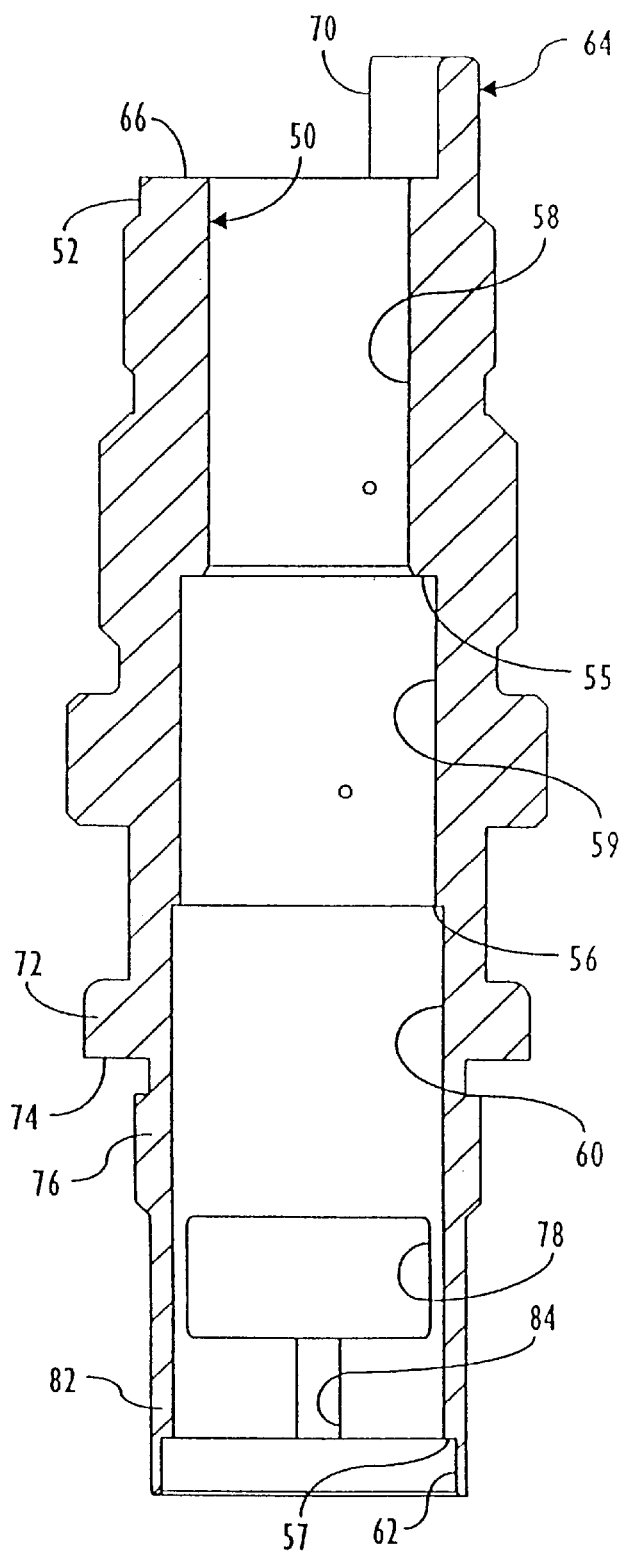
FIG. 5 is a sectional view showing the housing or bonnet of FIG. 4 in accordance with certain principles of the invention.

Referring to FIGS. 2, 3 and 5, the housing 32, which is composed of brass, is formed with an axial bore 50 which extends through the housing from a top end 52 to a bottom 54 thereof. As shown clearly in FIG. 5, three spaced shoulders 55, 56 and 57 are formed laterally within the bore 50 and divide the bore into four cylindrical chambers 58, 59, 60 and 62. The housing 32 is also formed with a stop wall 64 extending upward from an upper surface 66 at the top end 52 of the housing. Opposite ends of the stop wall 64 form stop surfaces 68 and 70 (FIG. 1). The housing 32 is also formed with a flange 72 which extends radially from an intermediate external portion of the housing to form a shoulder 74 on the underside of the flange. A threaded section 76 is formed on the external surface of the housing 32 below the flange 72. A pair of windows 78 and 80 (FIGS. 1 and 4) are formed through a cylindrical side wall 82 of the housing 32 near the bottom end 54 thereof. As shown in FIGS. 1, 3, 4 and 5, a pair of opposed vertical slots 84 and 86 are formed within bore 50 of the housing 32 and extend from the bottom 54 of the housing to a central portion of each of the windows 78 and 80.

Referring to FIGS. 6 and 7, the stem 36, which is composed of brass, is formed with a base 88 and a stem element 90 extending upward from the base. The base 88 is formed in a circular shape with a through slot 92 formed in an undersurface 94 thereof. It is noted that the slot 92 is offset slightly from the axis of the stem 36 as shown in FIG. 6 and, therefore, is not formed diametrically across the undersurface 94. The stem element 90 is formed with a pair of spaced circular bands 96 and 98 at the bottom and intermediate portions thereof which are formed with the same diameter. As shown in FIGS. 1 and 6, a first set of spaced splines 100 are formed on the stem element 90 immediately above the band 96. Uniformly wide spaces 101 are formed between all adjacent splines 100 except for a single pair of adjacent splines which are spaced to form a much wider space 103 (FIG. 1) therebetween. Each of the splines 100 extend radially outward from the stem element 90 and are parallel to the axis of the stem 36. Each of the splines 100 is formed with a lower, rectangularly shaped section 102, an intermediate section including a wide-angle "V" shaped notch 104 and a small rectangular portion 106. Each of the splines 100 is further formed with an upper section 108 which tapers inward and upward from portion 106 toward the axis of the stem 36. A second set of splines 110 is formed on the stem element 90 at the top thereof with spaces 111 formed between adjacent splines 110. Each of the set of splines 100 extend a uniform radial distance from the axis of the stem 36 which is greater than the extended uniform radial distance from the axis of each of the set of splines 110. As shown in FIGS. 1 and 7, a threaded opening 107 is formed in a top surface 109 of the stem element 90.

Figure 9:
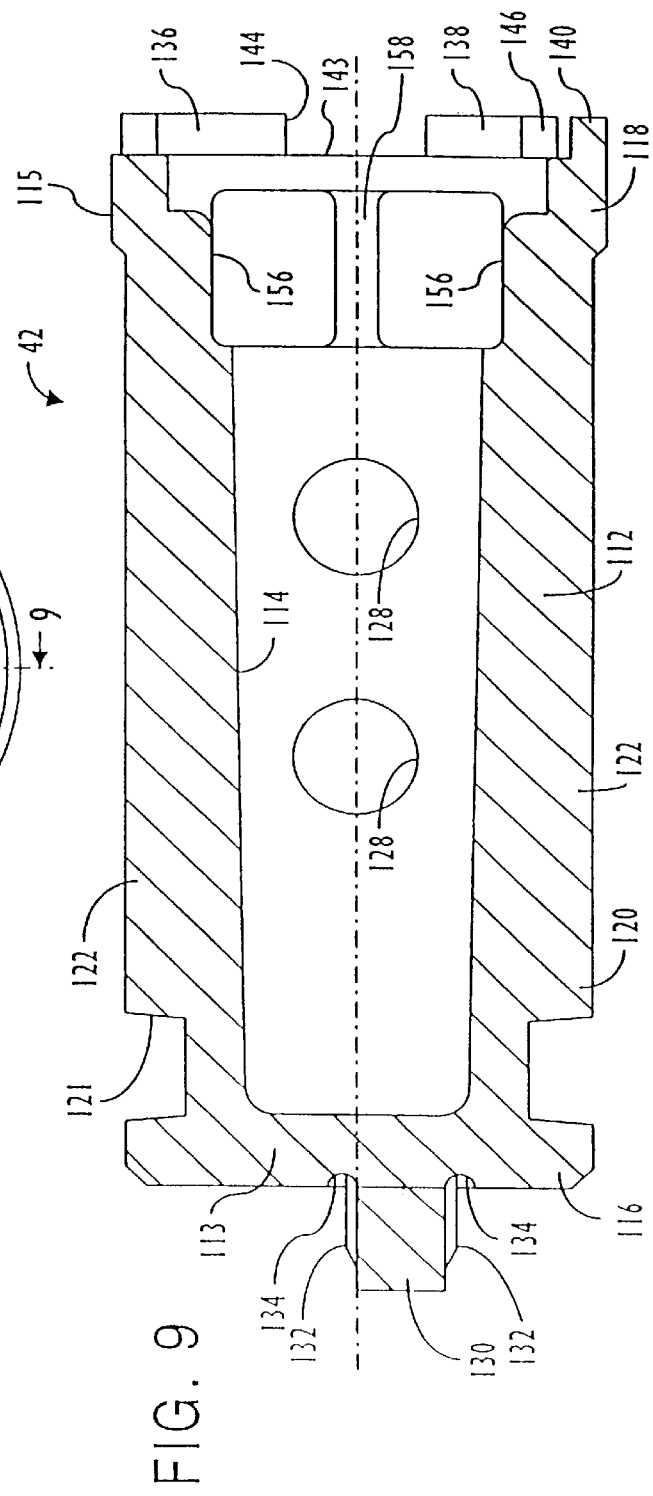
FIG. 9 is a side view showing structural features of the coupling of FIG. 8.
Figure 11:
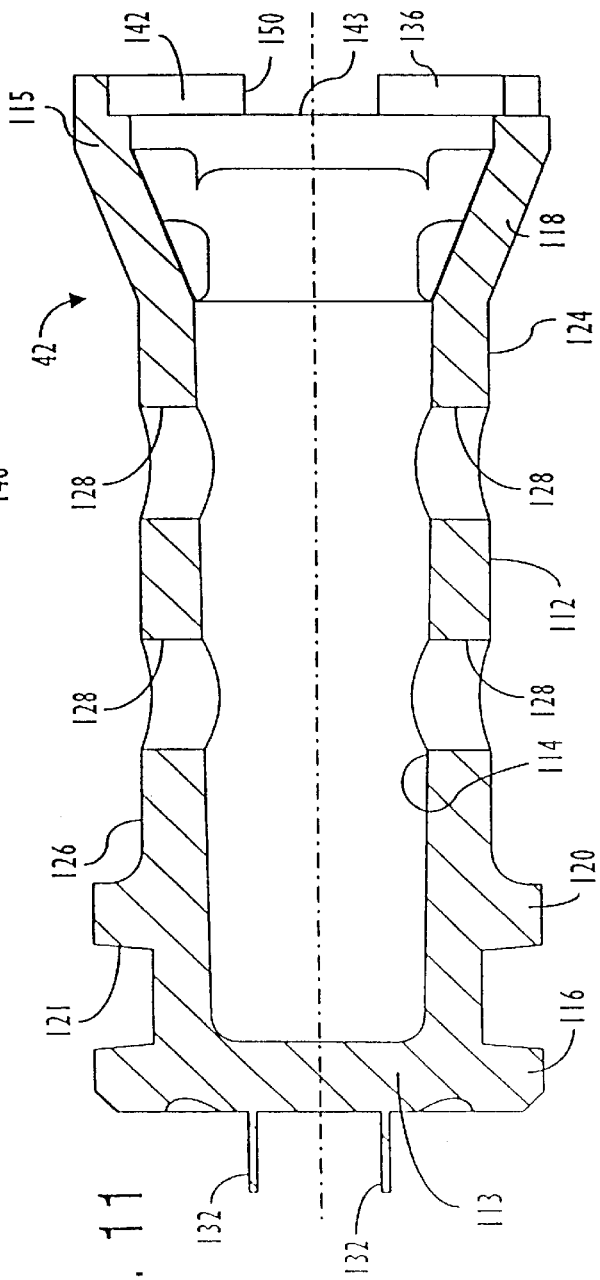
FIG. 11 is a side view, rotated ninety degrees from the side view of FIG. 9, showing structural features of the coupling of FIG. 8.

As shown in FIG. 1, the coupling 42, which is composed of a plastic material, is formed with a cylindrical intermediate body 112 which, as shown in FIGS. 9 and 11, is closed at an upper end 113 thereof and open at a bottom end 115 thereof. The body 112 is formed with an open chamber 114 which extends from the open bottom end 115 to the closed upper end 113 thereof. The exterior of the upper end 113 of the coupling 42 is formed with a circular flange 116 which is integrally formed with and extends radially outward from the top of the body 112. The bottom end 115 of the coupling 42 is formed with a flared section 118 (FIG. 11) which is located about the opening at the bottom of the chamber 114. A second circular flange 120 is formed about the body 112 spaced slightly from the flange 116 to form an annular groove 121 (FIGS. 2, 3, 9 and 11) therebetween for receiving a rubber O-ring 123 (FIGS. 1, 2 and 3). A pair of ribs 122 are formed on opposite sides of the body 112, as shown in FIGS. 1 and 9, between the flange 116 and the flared section 118 and are parallel to the axis of the coupling 42.

Figure 8:
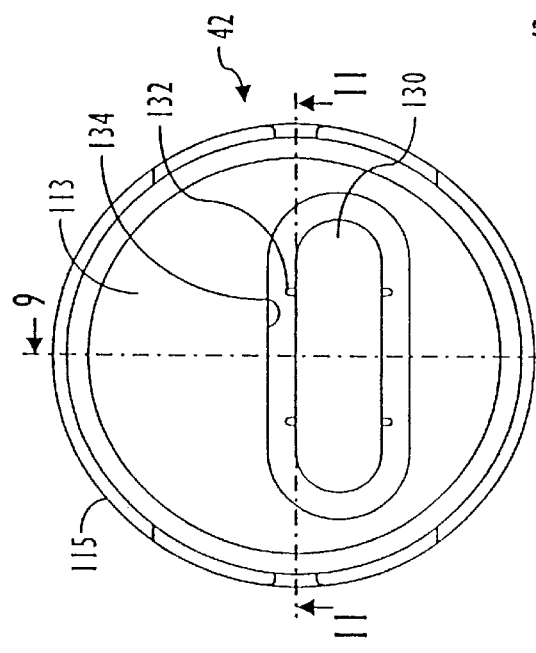
FIG. 8 is a top view showing structural features of one end of a coupling of the valve assembly of FIG. 1.

The ribs 122 separate the exterior surface of the body 112 between the flange 116 and the flared section 118 into two sections 124 and 126 (FIG. 1). As shown in FIG. 11, the body 112 is formed with four holes 128 which extend from the chamber 114 to the exterior of the coupling 42. The holes 128 are separated into two pairs of holes, two of which are open at section 124 and the other two open at section 126 of the coupling 42. As shown in FIGS. 8 and 9, a lug 130 extends in an axial direction from the upper end 113 of the coupling 42. The lug 130 is formed with rounded ends and with four crusher ribs 132 on opposite sides of the lug. A moat 134 is formed around the base of the lug 130. Also, the lug 130 is offset from the axis of the coupler 42.

Figure 10:
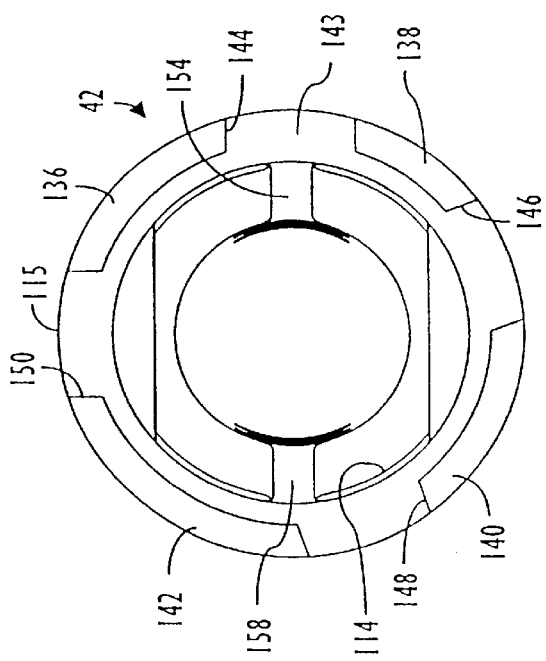
FIG. 10 is a bottom view showing structural features of the coupling of FIG. 8.

As shown in FIGS. 9, 10 and 11, the chamber 114 of the coupling 42 is open at the bottom end 115 and the coupling is formed with four spaced walls 136, 138, 140 and 142 of different circumferential lengths which extend in an axial direction from a bottom surface 143 at the bottom end. Spaces 144, 146, 148 and 150 are formed between respective pairs of the walls 136, 138, 140 and 142 as shown in FIG. 10 and are spaced radially from each other in a prescribed arrangement as illustrated. For example, as viewed in FIG. 10, space 144 is located about ninety degrees in a clockwise direction from space 150, space 146 is located about seventy degrees in a clockwise direction from space 144 and space 148 is located about one hundred and ten degrees in a counterclockwise direction from space 150.

As shown in FIGS. 1, a pair of windows 152 are formed through the section 126 of the coupler 42 adjacent the bottom end 115 and are separated by a strut 154. As shown in FIG. 9, an identical pair of windows 156, separated by a strut 158, are formed through the section 124 directly opposite the windows 152 and in the same manner. The windows 152 and 156 allow open communication between the outer portions of the coupler 42 adjacent the sections 126 and 124, respectively, and the chamber 114.

Figure 12:
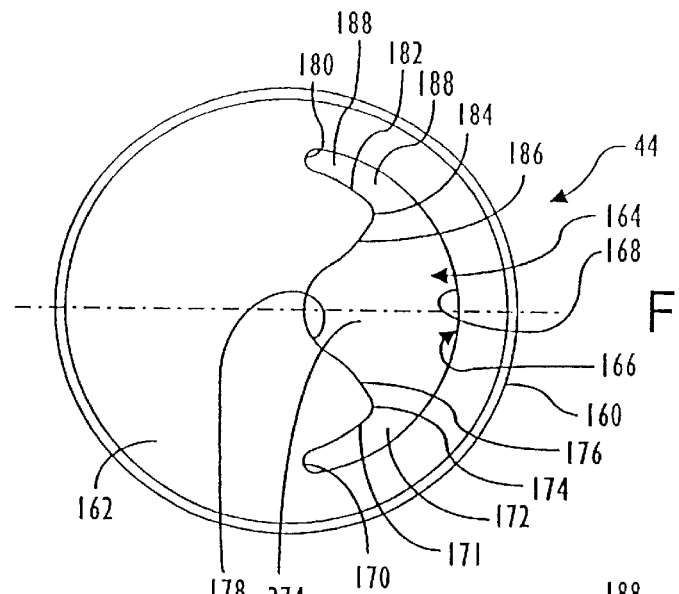
FIG. 12 is a bottom view of a first embodiment of a first valve element of the valve assembly of FIG. 1 showing structural features in accordance with certain principles of the invention.

Referring now to FIG. 12, the movable disk 44, which is composed of a ceramic material, is formed generally in a circular configuration having a sidewall 160, a bottom surface 162 and a passage 164 which extends through the disk. The passage 164 is formed with a contoured wall 166 of a prescribed configuration which includes an outboard wall section 168 spaced inward from the sidewall 160 and which follows the circular configuration thereof. The wall 166 further includes a small half-circle wall section 170 having two ends, one end of which is formed and joins with a respective end of the wall section 168. The wall 166 also includes a slightly curving wall section 171 which extends from the other of the two ends of the wall section 168. The wall section 170 is spaced from an adjacent portion of the wall section 168 and gradually extends inward toward the axis of the disk 44 to form a slightly widening but narrow channel 172 between the section 170 and the adjacent portion of the section 168. The wall section 171 and the opposite portion of the wall section 168 form an inside wall section and an outside wall section, respectively, of the channel 172 while the wall section 170 forms a base of the channel. The wall section 170 extends for a prescribed distance and then joins with one of two ends of a convex wall section 174. A convex linking wall section 176 joins and extends from the other of the two ends of the wall section 174 to a juncture where the section 176 joins with a deep concave wall section 178 which is spaced considerably from an opposite portion of the wall section 168. The convex wall projection 174 and the linking wall section 176 combine to form a combined convex wall section which extends between its juncture with the curving wall section 171 and the concave wall section 178.

In similar fashion, the other end of the wall section 168 joins with portions of the wall 166 formed by a half-circular wall section or channel base 180, a slightly curving or channel inside wall section 182, a convex wall section 184 and a linking wall section 186 which joins with the other end of the concave wall section 178 to complete the wall 166. A widening but narrow channel 188 is formed between the section 182 and an adjacent portion of the wall section 168 in the same manner as the channel 172. It is noted that, while the wall 166 is formed in the contour as illustrated in FIG. 12, the portion of the passage 164 above the horizontal centerline of the disk 44 is symmetrical with the portion of the passage below the centerline. It is also noted that the configuration of the passage 164 as defined by the wall 166 is a prescribed configuration which has been precisely designed to provide for the efficient and acoustically friendly flow of water therethrough during various stages of use of the valve assembly 30 from a fully "off" condition to a fully "on" condition.

A large open bay 274 is formed by a large portion of the passage 164. The bay 274 is defined by a central portion of the wall section 168 (exclusive of the portions defining the channels 172 and 188), the convex wall sections 174 and 184, the linking wall sections 176 and 186, the concave wall section 178 and an open mouth of each of the channels. In this manner, the bay 274 is in communication with the narrow channels 172 and 188.

Figure 13:
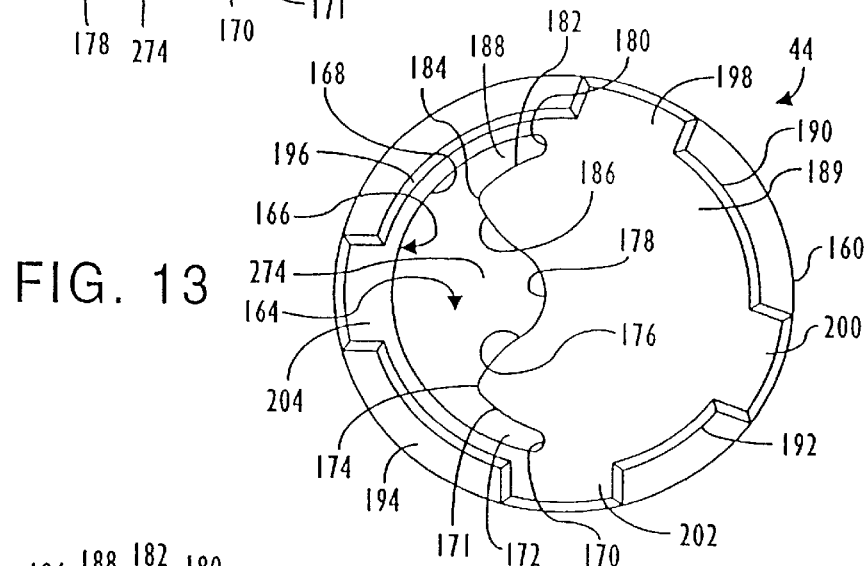
FIG. 13 is a top view of the first valve element of FIG. 12 showing structural features in accordance with certain principles of the invention.
Figure 14:
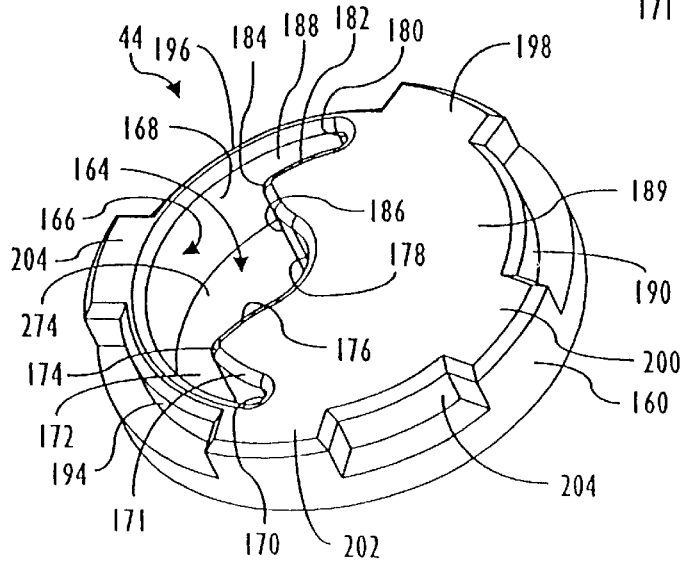
FIG. 14 is a perspective view showing structural features of the first valve element of FIG. 12 in accordance with certain principles of the invention.

Referring to FIGS. 13 and 14, the disk 44 is formed with a top surface 189 which is contiguous with the passage 164. Four notches 190, 192, 194 and 196 are formed spatially in the top surface 189 and in the contiguous portions of the sidewall 160 resulting in the formation of four radial fingers 198, 200, 202 and 204. The depth of each of the notches 190, 192, 194 and 196, and consequently the fingers 198, 200, 202 and 204, is about one-half the thickness of the disk 44. It is noted that the radial arrangement of the fingers 198, 200, 202 and 204 is the same as the radial arrangement of the spaces 144, 146, 148 and 158 of the coupler 42 (FIG. 10).

Figure 15:
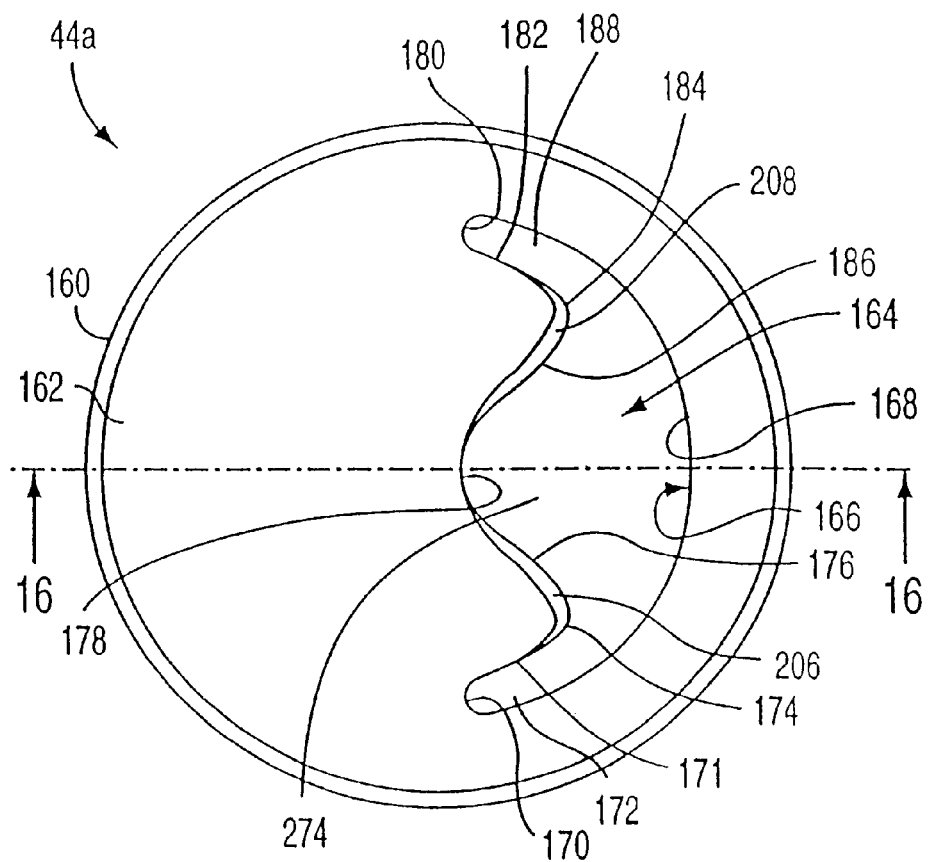
FIG. 15 is a bottom view showing structural features of a second embodiment of a first valve element in accordance with certain principles of the invention.
Figure 16:
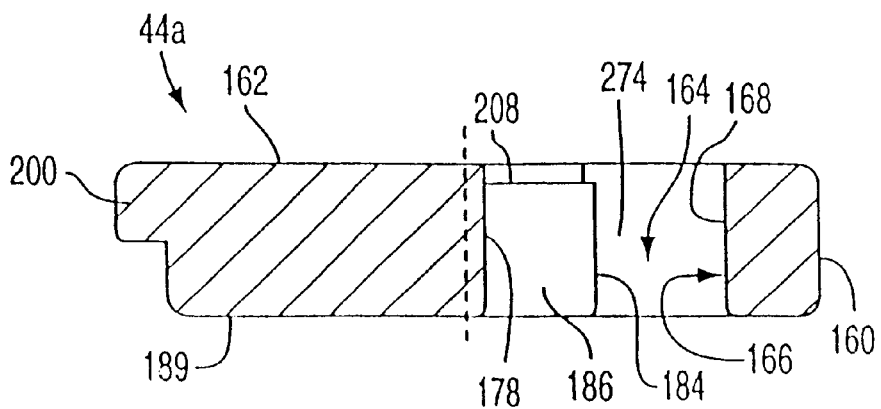
FIG. 16 is a sectional view taken along line 16—16 of FIG. 15 showing some of the structural features of the valve element of FIG. 15.

A second embodiment of the movable disk of the valve assembly 30 is illustrated in FIGS. 15 and 16 and is very similar to the disk 44 of the first embodiment and is also composed of a ceramic material. In order to distinguish between the first and second embodiments, the numeral "44*a*" will identify the second embodiment. The numerals assigned above to the structural elements of the first embodiment of the disk 44 as illustrated in FIGS. 12, 13 and 14, which are common to the structure of the second embodiment, will be used in the illustrations of the second embodiment of the disk 44*a* of FIGS. 15 and 16, with additional numerals being used to define the differences between the two embodiments.

As viewed from the bottom of the disk 44*a* in FIG. 15, a first step 206 is formed in the portion of the wall 166 which includes the linking wall section 176 and slight adjacent portions of the convex wall section 174 and the concave wall section 178. A similar step 208 is formed in the linking wall section 186 of the wall 166 and extends slightly to adjacent portions of the convex wall section 184 and the concave wall section 178. As viewed in FIG. 16, the step 208 is located a very short inboard distance from the plane of the bottom surface 162 of the disk 44*a*. The step 206 is also located the same distance from the surface 162.

Figure 17:
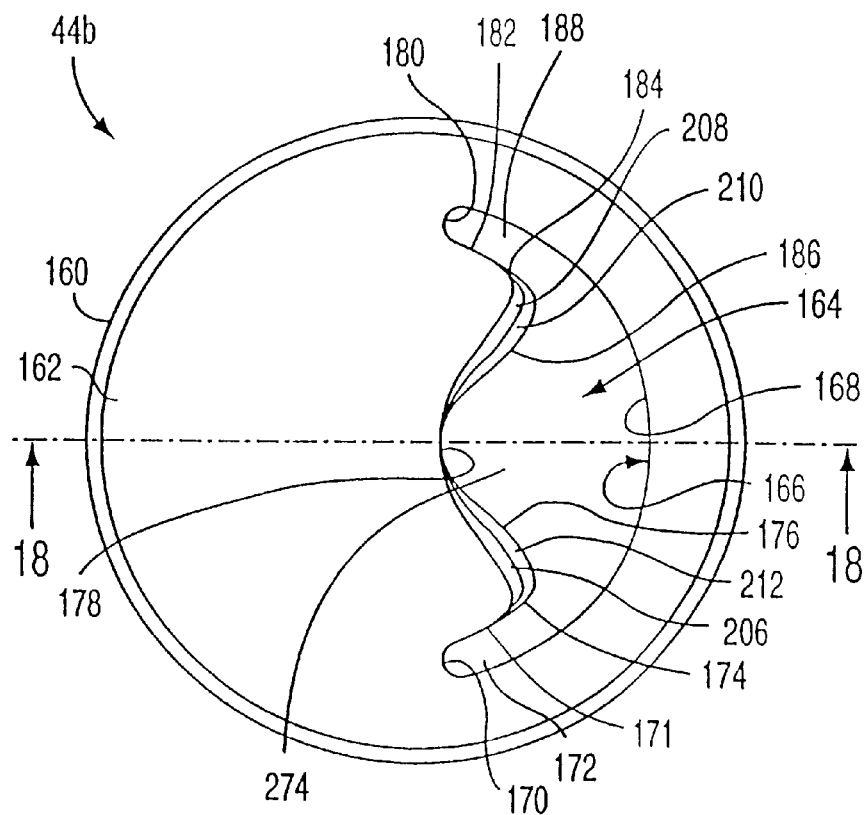
FIG. 17 is a bottom view showing structural features of a third embodiment of a first valve element in accordance of certain principles of the invention.
Figure 18:
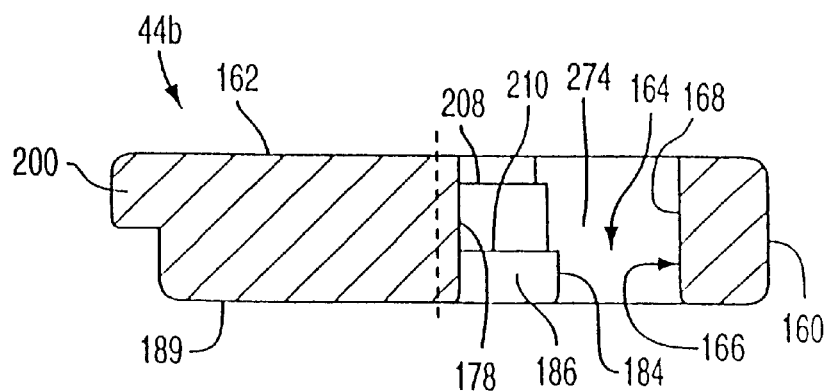
FIG. 18 is a sectional view taken along line 18—18 of FIG. 17 showing some of the structural features of the valve element of FIG. 17.
Figure 19:
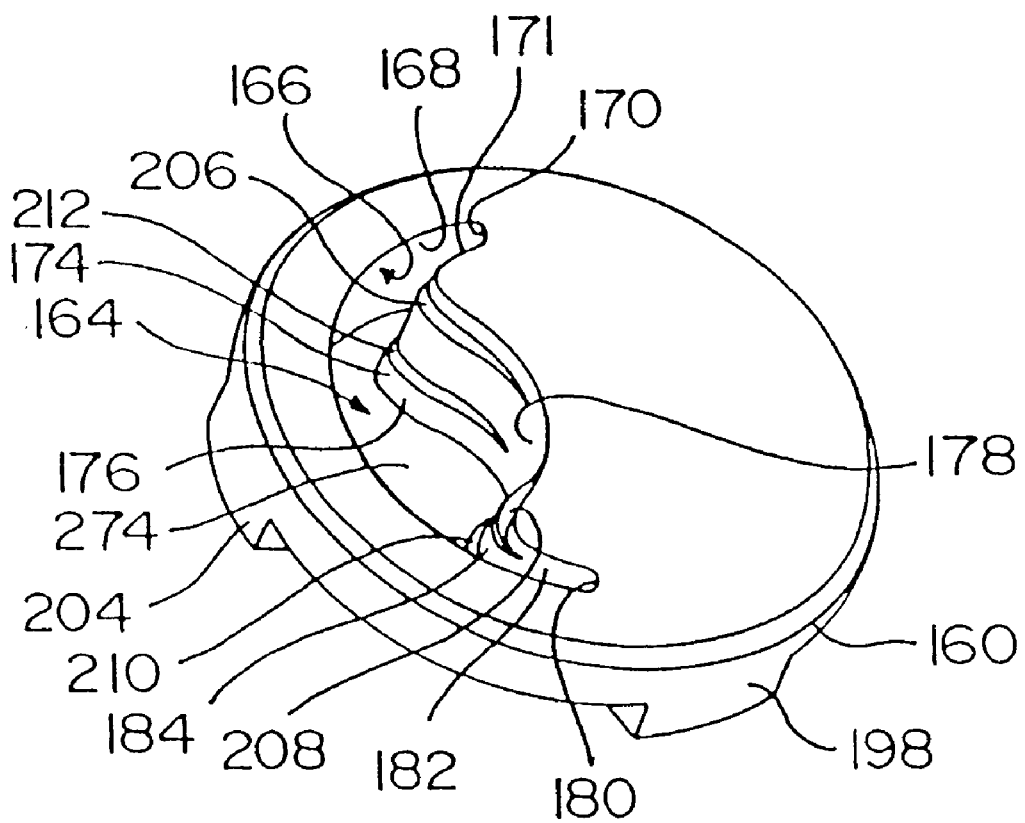
FIG. 19 is a perspective view showing structural features of the valve element of FIGS. 17 and 18.

A third, and preferred, embodiment of the movable disk of the valve assembly 30 is illustrated in FIGS. 17, 18 and 19 and is very similar to the disks 44 and 44*a* of the first and second embodiments, respectively. In order to distinguish between the three embodiments, the numeral "44*b*" will identify the third embodiment. The numerals above which identify the structural elements of the first and second embodiments of the disks 44 and 44*a* as illustrated in FIGS. 12 through 16 will be used in the illustrations of the third embodiment of the disk 44*b* of FIGS. 17, 18 and 19 to identify structure common to the three embodiments. Additional numerals will be used to define the additional structure of the third embodiment of the disk 44*b* which is also composed of a ceramic material.

As shown in FIGS. 17, 18 and 19, a second step 210 is formed in the linking wall section 176 of the disk 44*b* and is spaced from the first step 208 toward the top surface 189 of the disk 44*b*. The step 210 is formed generally along the same portion of the wall 166 as the step 208, that is, it extends along the linking wall section 186 and slightly into the convex wall section 184 and the concave wall section 178. In similar fashion, a second step 212 is formed adjacent the step 206 and is spaced therefrom in the same manner as the step 210 is spaced from the step 208.

Figure 20:
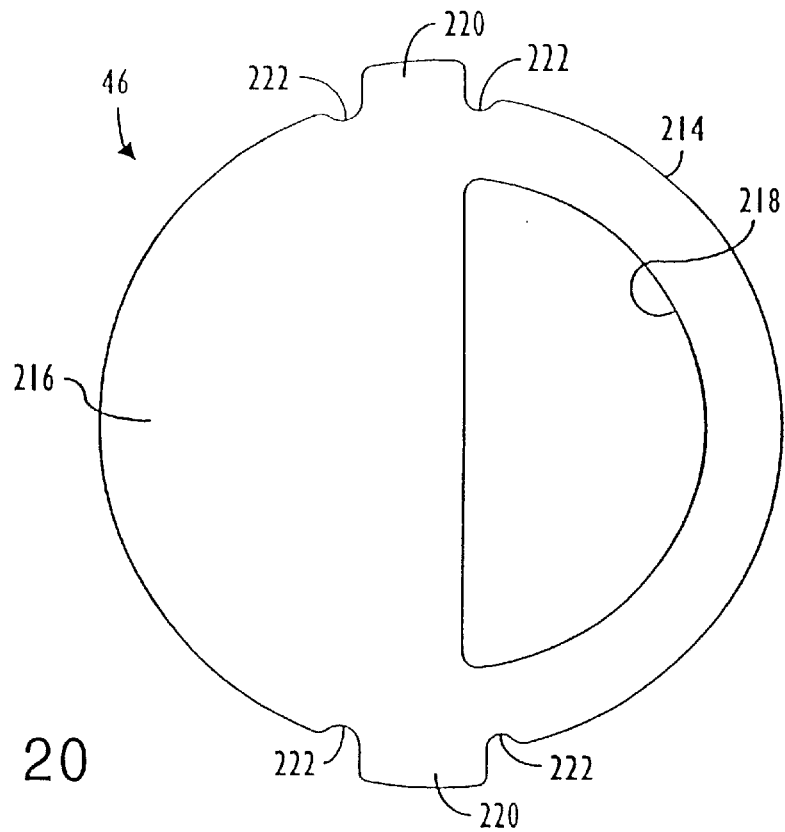
FIG. 20 is bottom view showing structural features of a second valve element of the valve assembly of FIG. 1 in accordance with certain principles of the invention.
Figure 21:
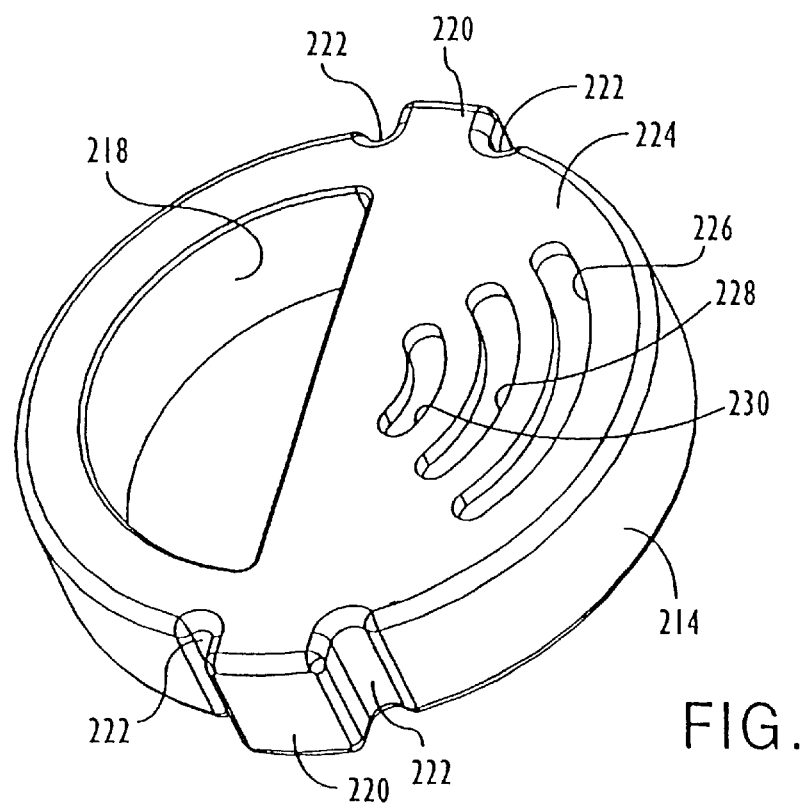
FIG. 21 is a perspective view showing structural features of the second valve element of FIG. 20 in accordance with certain principles of the invention.

Referring now to FIG. 20, the fixed disk 46, which is composed of a ceramic material, is formed generally in a circular configuration having a sidewall 214, a bottom surface 216 and a passage 218 which extends through the disk. The passage 218 is formed generally in a half-circle configuration. A pair of locating lugs 220 extend radially outward from diametrically opposite portions of the sidewall 214. Grooves 222 are formed in the sidewall 214 adjacent, and on each side of, the base of each of the lugs 220. As shown in FIG. 21, the fixed disk 46 is also formed with an upper surface 224 which has three arcuate, closed-end grooves 226, 228 and 230 formed therein.

Figure 22:
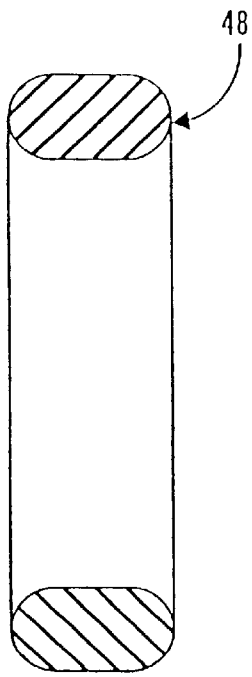
FIG. 22 is a sectional view showing structural features of a bottom seal of the valve assembly of FIG. 1.

As shown in FIG. 22, bottom seal 48 is formed in a circular ring-like configuration having generally an oval cross section and is composed of a rubber material suitable for forming a water seal.

Figure 23:
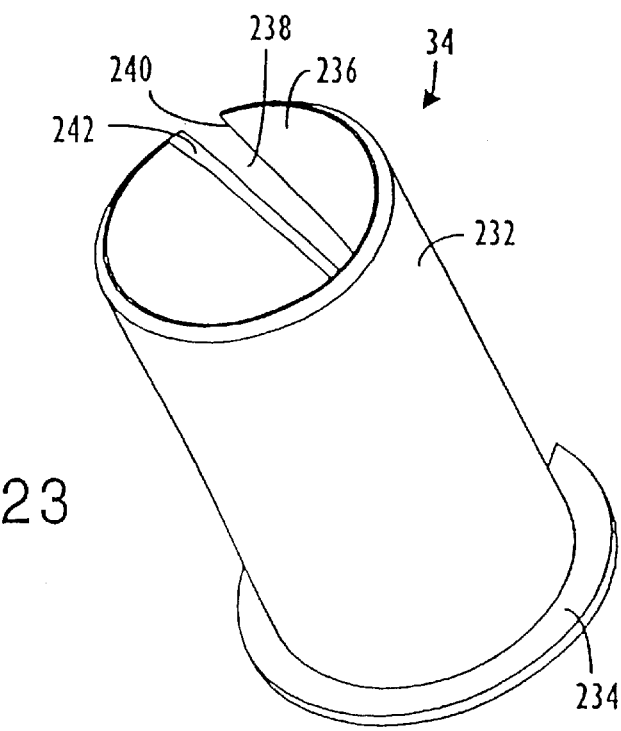
FIG. 23 is a perspective view showing structural features of a bushing of the valve assembly of FIG. 1 in accordance with certain principles of the invention.
Figure 24:
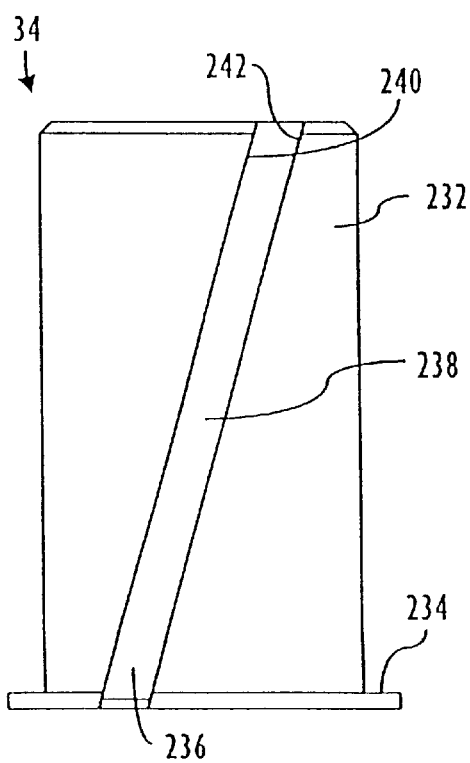
FIG. 24 is a side view showing structural features of the bushing of FIG. 23 in accordance with certain principles of the invention.

Referring to FIGS. 23 and 24, the bushing 34, which is composed of a plastic material, is formed in the configuration of a cylinder 232 with a flange 234 extending radially from one end thereof. The cylinder 232 is formed with a bore 236 extending axially therethrough and a slanted slot 238 in the wall of the cylinder. The slot 238 extends from and through one axial end of the cylinder 232 to and through the opposite axial end and through the flange 234. Consequently, the slot 238 is formed with two spaced, interfacing walls 240 and 242.

Figure 25:
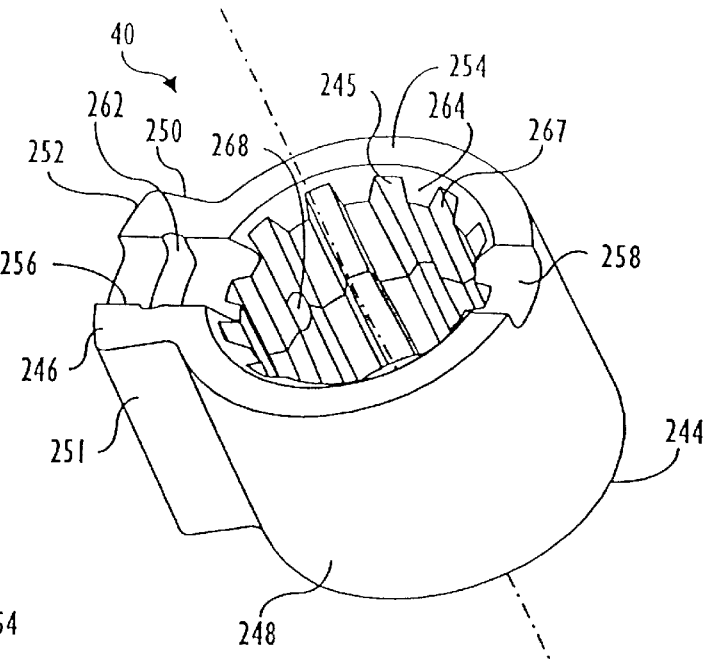
FIG. 25 is a perspective view showing structural features of a stop of the valve assembly of FIG. 1 in accordance with certain principles of the invention.
Figure 26:
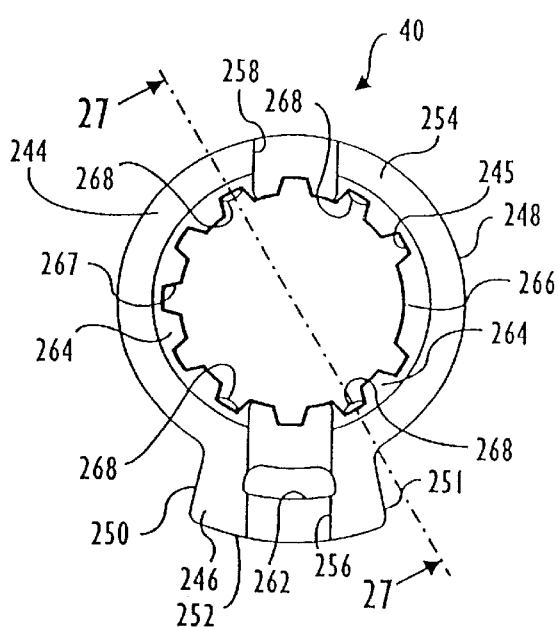
FIG. 26 is an end view showing structural features of the stop of FIG. 25 in accordance with certain principles of the invention.

As shown in FIGS. 25 and 26, the stop 40, which is composed of a plastic material, is formed generally with a cylindrical section 244 having an axial bore 245 formed therethrough. A projection 246 is formed with the section 244 and extends radially from a portion of a sidewall 248 of the section. The projection 246 is formed with spaced sidewalls 250 and 251 which taper inward from an outboard, convex surface 252. The stop 40 is formed with a first end surface 254 which forms one end of the cylindrical section 244 and the projection 246. A first groove 256 is formed in the end surface 254, radially of the axis of the stop 40 and into the projection 246 and the cylindrical section 244. A second groove 258 is formed in the bottom surface 254, radially of the axis of the stop 40 and into the cylindrical section 244. The first groove 256 is diametrically aligned with the second groove 258 and the grooves are located on opposite sides of the bore 245. As shown in FIG. 1, the stop 40 is formed with a second end surface 260 at the end opposite the end surface 254 which surrounds the bore 245 and extends over the projection 246. The projection 246 is also formed with an opening 262 which extends through the projection between the surfaces 254 and 260 as shown in FIG. 3.

Figure 27:
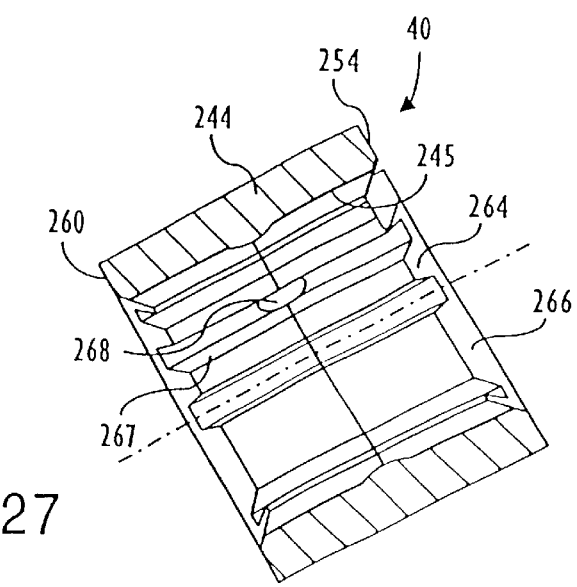
FIG. 27 is sectional view showing structural features of the stop of FIG. 25 in accordance with certain features of the invention.

As viewed in FIGS. 25, 26 and 27, each of a plurality of splines 264 are formed with a prescribed width and extend radially inward from the wall of the bore 245 and extend in an axial direction between the end surfaces 254 and 260. Each of the splines 264 is spaced equally by a prescribed distance from adjacent splines to form a space 267 between each set of adjacent splines. A wide spline 266, which is wider than the prescribed width and which complements the width of the space 103 (FIG. 1) of the stem 36, also extends radially inward from the wall of the bore 245 in an axial direction and is spaced from adjacent ones of the splines 264 on each side thereof by the prescribed distance. Each of four of the spaces between adjacent splines 264 has a bump or bead 268 of relatively short axial length formed therein generally centrally within the bore 245.

In one process of assembling the elements of the non-riser valve assembly 30, a lubricant is placed on the outer surface of the stem 36 in the area between the spaced bands 96 and 98. Thereafter, the flange end of the bushing 34 is positioned axially over the splined end of the stem 36 and the bushing is moved over the stem until the flange 234 rests on the base 88 of the stem.

Thereafter, the O-ring 123 is placed in the annular groove 121 of the coupling 42 which is then positioned so that the offset lug 130 thereof is aligned with the offset slot 92 of the stem 36. The lug 130 is then moved into the slot 92 where the crusher ribs 132 are disturbed to provide a firm friction fit of the lug within the slot.

During manufacture of the movable disk 44 and the fixed disk 46, the bottom surface 162 of the movable disk and the upper surface 224 are highly polished so that the two surfaces, when mated, form a seal to prevent water from leaking from the periphery juncture thereof. Also, by being highly polished, the surfaces 162 and 224 allow for easy turning of the valve assembly 30 by a user thereof in a user-friendly manner. In addition, the grooves 226, 228 and 230 formed in the upper surface 224 of the fixed disk 46 reduces the interfacing surface area between the movable disk 44 and the fixed disk to further provide for easy turning of the movable disk. A small amount of lubricant is placed on the interfacing surfaces 162 and 224, with some of the lubricant locating in the grooves 226, 228 and 230, to further enhance the turnability of the valve assembly 30.

The upper surface 189 of the movable disk 44 is positioned adjacent and aligned axially with the bottom end 115 of the coupling 42 with the fingers 198, 200, 202 and 204 of the movable disk being aligned with the spaces 150, 144, 146 and 148, respectively. The movable disk 44 is then moved into assembly with the bottom end 115 of the coupling 42 with the fingers 198, 200, 202 and 204 being located in the spaces 150, 144, 146 and 148, respectively, to insure that the movable disk is properly located with respect to the coupling. This manner of assembly of the movable disk 44 with the coupling 42 also insures that the movable disk is properly located with respect to the splines 100, and more particularly the wide space 103, of the stem 36 by virtue of the previously-described offset assembly of the coupling lug 130 with the stem slot 92.

The splined end of the stem 36, with the assembled bushing 34, coupling 42 and movable disk 44, are inserted and moved into the axial bore 50 of the housing 32 at the bottom end 54 thereof until the flange 234 of the bushing engages shoulder 55 within the bore. At this point, intermediate and lower portions of the stem 36 occupy the chamber 58 and portions of the chamber 59. Also, the splines 100 and 110 of the stem 36 have been extended fully through the bore 50 of the housing 32 and are fully exposed above the upper surface 66 of the housing. Further, the coupling 42 is located within portions of chambers 59 and 60 with the O-ring 123 forming a seal against the wall of the chamber 59, and the movable disk 44 is located within an intermediate portion of the chamber 60.

Thereafter, with the upper grooved surface 224 of the fixed disk 46 facing the bottom end 54 of the housing 32, the disk is axially aligned with the housing and the lugs 220 of the disk are aligned with the slots 84 and 86 of the housing. The fixed disk 46 is then inserted into the chamber 60 of the housing 32 with the lugs 220 passing into the slots 84 and 86. Eventually, the upper surface 224 of the fixed disk 46 interfaces with and engages the bottom surface 162 of the movable disk 44 and the bottom surface of the fixed disk is generally flush with the shoulder 57 of the housing. The stem 36 is then turned until the passage 164 of the movable disk 44 and the passage 218 of the fixed disk 46 assume the relative positions illustrated in FIG. 29 to block the passage 164 whereby the stem and the movable disk are in the fully closed position.

The bottom seal 48, which has an outer diameter slightly greater than the inner diameter of the housing chamber 62, is inserted into the chamber and against the bottom surface 216 of the fixed disk 46 to essentially retain the assembled components within the housing 32.

The stop 40 is then positioned so that, depending upon which stem-turning convention is to be used as described below, either the grooved end surface 254 or the ungrooved end surface 260 of the stop is spaced from but facing the top surface 109 of the stem 36 and so that the stop is in axial alignment with the stem 36. Also, the wide spline 266 of the stop 40 is aligned with the complementarily wide space 103 of the stem 36. The stop 40 is then moved axially onto the stem 36.

As noted above, the outboard ends of the splines 110 extend radially from the axis of the stem 36 for a distance which is less than the radial distance of the inboard ends of the splines 264 from the axis of the stop 40 The splines 264 of the stop 40 are designed to mesh ultimately with the splines 100 of the stem 36. Since the splines 110 extend radially for a distance less than the splines 100 in the manner noted above, there is sufficient clearance to allow the stop 40 to be moved axially over and past the splines 110 without interference between the splines 110 and the splines 264.

Eventually, the splines 264 of the stop 40 mesh with the splines 100 of the stem 36 with the wide spline 266 being located in the wide space 103. As the stop 40 is being assembled onto the splines 100 of the stem 36, the four bumps 268 of the stop, snap into the "V" notches 104 of adjacent splines 100 to effectively lock the stop on top of the stem. A low level force is required to withdraw the stop 40 from the splines 100 of the stem 36 whereby the bumps 268 move out of the "V" notches 104.

When the stop 40 is assembled onto the stem 36, the projection 246 will locate in either of two positions depending upon the turning convention which has been selected for the subject valve assembly 30. This insures that the projection 246 is in position to allow rotation of the stop 40 about the axis of the valve assembly 30 between and within the limits defined by the stop surfaces 68 and 70 of the stop wall 64 and the spaced sidewalls 250 of the stop in the selected turning convention as described below.

During assembly of the bushing 34 with the stem 36 as described above, and due to the slanted slot 238 of the bushing 34, the bushing expands slightly to fit snugly around the bands 96 and 98 but is allowed to rotate freely relative to the bands and the stem 36 during use of the valve assembly 30. During this rotational movement, some of the above-noted lubricant which was heretofore confined to some extent between the bushing 34 and the stem 36 will "work" its way through the slot 238 and thereby provide lubricant for surfaces not only between the stem and the bushing but also for the surfaces between the bushing and the housing 32.

The slanted arrangement of the slot 238 also provides radial structural integrity for the bushing 34 during use of the valve assembly 30 by enhancing the radial stiffness of the bushing. For example, if the slot 238 was straight in an axial direction from the top to the bottom of the bushing 34, the bushing could have a weakened radial integrity along the straight column of the slot. By forming the slot 238 on a slant, there are no top-to-bottom straight sections of the bushing 34 which are completely void of the bushing material such as in the above example where the slot is straight and in an axial direction. In fact, for each top-to-bottom straight section of the bushing 34 in the vicinity of the slanted slot 238, only that portion of each straight section which intersects the slanted slot is void of material. All other portions of each straight section include the material of the bushing 34 and thereby provide structural and radial integrity for the bushing.

Further, the bushing 34 provides a snug assembly of the stem 36 within the housing 32 to minimize the wobbling of the stem within the housing and thereby provide an anti-wobbling effect. Consequently, the user of a faucet which includes the valve assembly 30 experiences a secure, non-wobble feeling when turning the stem 34 within the housing 32, and a smooth and user-friendly turning enhanced by the lubricant which is allowed to locate on each side of the cylinder 232 of the bushing 34.

When a riser-type valve is used in a two-handle faucet, the stem of the valve is rotated to move the stem axially to control the flow of hot water into the faucet. When the hot-water valve is open, the stem is turned in a clockwise direction to move the stem axially to close the valve. When the riser-type valve is used to control the flow of cold water, the stem of the cold-water valve which is open is turned in a counterclockwise direction to move the stem axially to close the valve. This process establishes a "turning convention" which is well known by users of such valves.

In a non-riser type valve, such as valve assembly 30, the stem of the valve does not move axially but is rotatable to open and close the valve by operation of a lever handle 270 (FIG. 2) or a non-lever knob handle 272 (FIG. 3), such as a cross handle or a round handle, all of which are assembled with the splines 110 of the stem 36. In order to maintain the above-noted turning convention when using the lever handle 270, the valve assembly 30 can be selectively adjusted during assembly and/or installation such that the stem 36 can be turned clockwise to close the valve associated with the hot water and can be turned counterclockwise to close the valve associated with the cold water.

The stop wall 64, and the stop surfaces 68 and 70, function in conjunction with the projection 246 to limit the rotational movement of the stem 36 to one-half of a full turn. When the valve assembly 30 is to be used with the lever handle 270 to control the supply of hot water, the stop 40 must be located such that the sidewall 250 of the projection 246 is in engagement with the stop surface 70 when the valve assembly is in the closed position. This is accomplished by rotating the stem 36 without the stop 40 or the lever 270 in assembly therewith and viewing the bottom of the valve assembly 30 to determine when the movable disk 44 has been positioned to allow the fixed disk 46 to cover the passage 164 of the movable disk. At this position, the stop 40 is positioned spatially from the top surface 109 of the stem 36 so that the grooves 256 and 258 are facing away from the stem as an indication that the stop is in position for assembly for controlling a hot water valve assembly. In addition, the wide spline 266 of the stop 40 is properly aligned with the wide space 103 of the stem 36 so that, when the stop is assembled with the stem, the sidewall 250 of the projection 246 is located in engagement with the stop surface 70.

When the valve assembly 30 which includes the lever 270 is used to control the supply of cold water, the stop 40 is assembled with the stem 36 with the grooves 256 and 258 of the stop facing inward of the housing 32 and interfaces with the upper surface 66 thereof. In this instance, the stop surface 250 is placed in engagement with stop surface 68 of the stop wall 64 when the valve assembly 30 is in the closed position.

Thus, when the lever 270 is used to control the supply of hot water through the valve assembly 30, the grooves 256 and 258 will face outward from the valve assembly, and will face inward of the valve assembly when controlling the supply of cold water through the valve assembly. When the knob handle 272 is used instead of a lever handle 270 to control the supply of hot or cold water, the turning convention noted above does not have to be utilized. Therefore, the stop 40 can be assembled in either of the two orientations noted above. As a matter of course, when the valve assembly 30 is destined for assembly with the knob handle 272, the grooves 256 and 258 face outward from the valve assembly 30 for both the hot and cold supply valve assemblies.

The design of the stop 40 for use in the valve assembly 30, as described above, provides for the efficient assembly of the stop at the manufacturing site and also provides for a simple adjustment at the installation site, prior to assembly, in the event that the stop is not oriented properly for the selected hot or cold water-control use. Even after installation, the lever handle 270 or the knob handle 272 can be removed from the stem 36 and the stop 40 can be directly accessed for adjustment without dismantling any other elements of the valve assembly 30.

Figure 28:
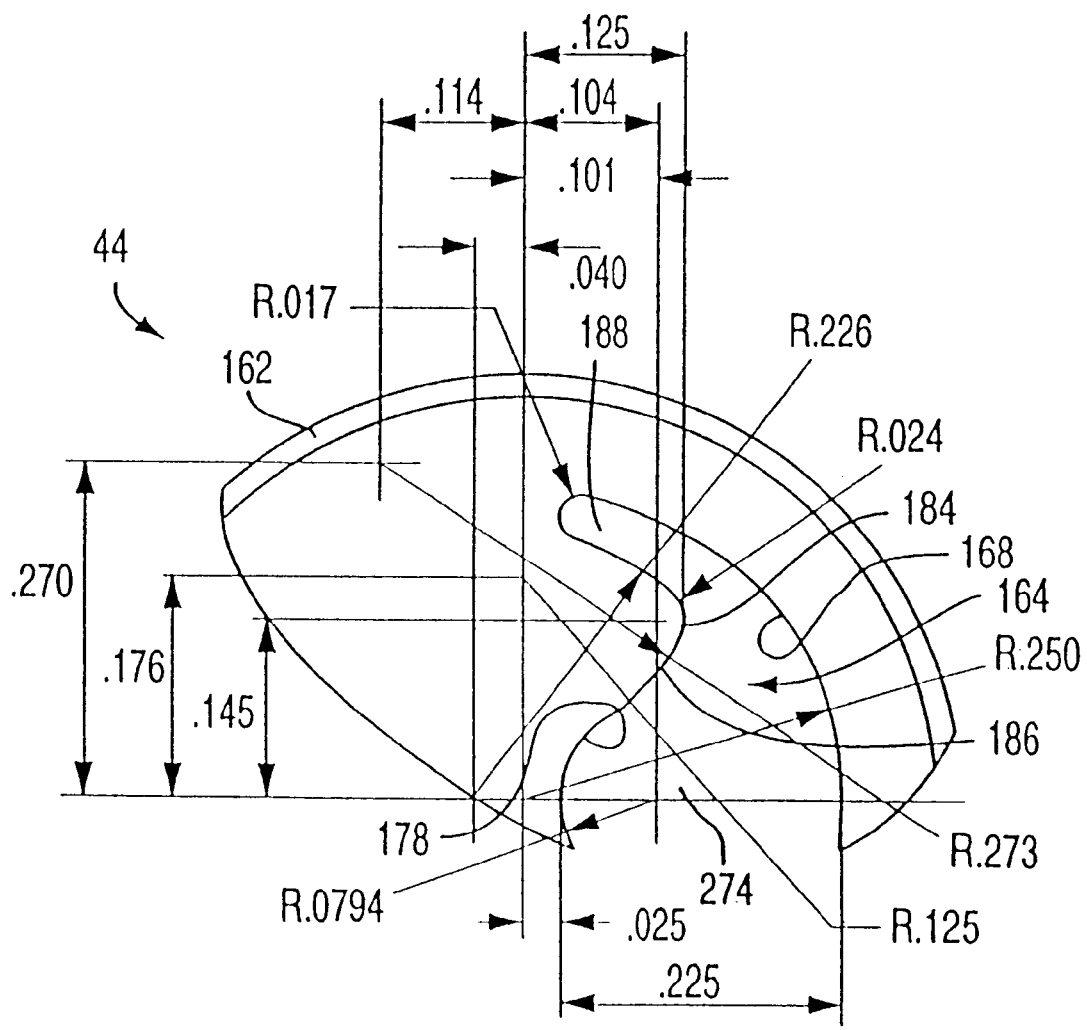
FIG. 28 is a partial bottom view of the first embodiment of the first valve element of FIG. 12 showing dimensional features of the first valve element in accordance with certain principles of the invention.

Referring to FIG. 28, a portion of the movable disk 44 is illustrated with various dimensions in inches to reveal the precise configuration of the preferred embodiment of the passage 164. While only one-half of the passage 164 is shown in FIG. 28, the other half of the passage 164 is a mirror image of the illustrated portion. The full view of the passage 164 is shown in FIG. 12. The portion of the passage 164 shown in FIG. 28 is formed by the narrow channel 188 which opens into the much larger bay 274 of the passage.

Figure 29:
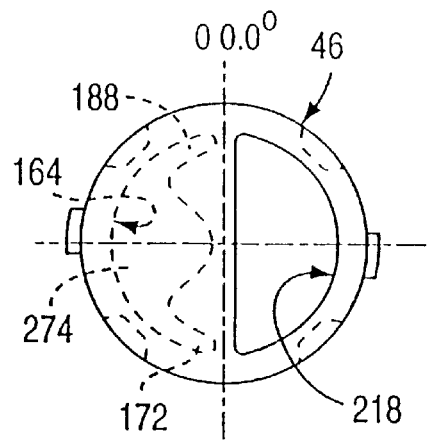
FIG. 29 is a diagrammatical view showing the relative positions of the first valve element of FIG. 12 and the second valve element of FIG. 20 when the valve assembly of FIG. 1 is fully closed which represents a zero degrees position.

Referring to FIG. 29, a schematical representation shows the assembled movable disk 44 and the fixed disk 46 as viewed from the bottom surface 216 of the fixed disk. As illustrated, the passage 164 of the movable disk 44 is covered by the solid portion of the fixed disk 46 to preclude the supplying of water through the passage at a zero-degrees position of the movable disk.

Figure 30:
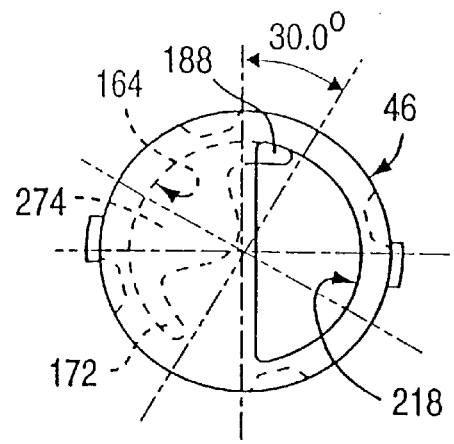
FIG. 30 is a diagrammatical view showing the relative positions of the first valve element of FIG. 12 and the second valve element of FIG. 20 when the valve assembly of FIG. 1 is opened by thirty degrees.
Figure 31:
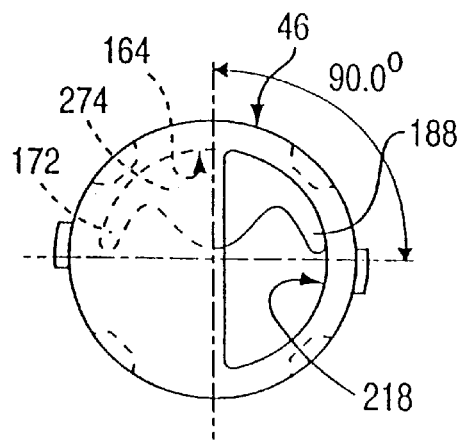
FIG. 31 is a diagrammatical view showing the relative positions of the first valve element of FIG. 12 and the second valve element of FIG. 20 when the valve assembly of FIG. 1 is opened by ninety degrees.
Figure 32:
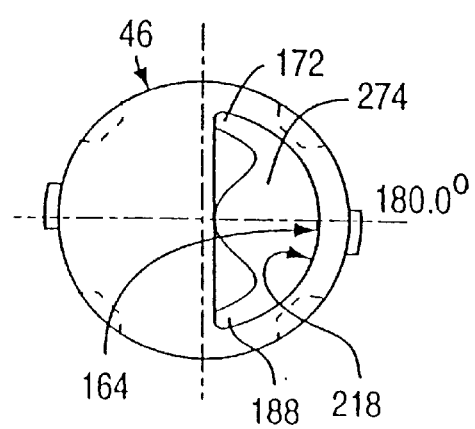
FIG. 32 is a diagrammatical view showing the relative positions of the first valve element of FIG. 12 and the second valve element of FIG. 20 when the valve assembly of FIG. 1 is opened by one-hundred and eighty degrees or the fully open position of the valve assembly.

As shown in FIG. 30, the movable disk 44 has been moved by thirty degrees in the clockwise direction whereby a small leading portion of the narrow channel 188 of the passage 164 is overlapping the passage 218 of the fixed disk 46 to allow a small flow of water to be supplied through the associated valve assembly 30. Referring to FIG. 31, the movable disk 44 has been moved by ninety degrees in a clockwise direction such that the valve assembly 30 is nearly one-half open. In this position, water continues to flow through the narrow channel 188 of the movable disk 44 while significantly more water is allowed to flow through an uncovered part of the larger portion 274 of the passage 164 of the movable disk. Finally, as shown in FIG. 32, the movable disk 44 continues to be turned in a clockwise direction until the valve assembly 30 is fully open. In this manner, the movable disk 44 has been moved by one-hundred and eighty degrees so that all of the passage 164 of the movable disk 44, including the narrow channels 172 and 188 and the larger portion 274, overlaps the passage 218 of the fixed disk 46.

It is noted that, if the movable disk 44 was turned in the counterclockwise position from the zero-degrees position of FIG. 29, the valve assembly 30 would react in the same manner as described above with respect to narrow channel 188 except that narrow channel 172 would be uncovered initially.

The following chart illustrates the AREA, in square inches, of the overlap of the passage 164 of the movable disk 44 with the passage 218 of the fixed disk 46 by angular movement, in DEGREES, of the movable disk in increments of ten degrees between zero degrees and one-hundred and eighty degrees:

| DEGREES | AREA | DEGREES | AREA | DEGREES | AREA |
| --- | --- | --- | --- | --- | --- |
| 0.00 | 0.00 | 60.00 | 0.009251 | 120.00 | 0.04106 |
| 10.00 | 0.00 | 70.00 | 0.014331 | 130.00 | 0.04647 |
| 20.00 | 0.000695 | 80.00 | 0.01956 | 140.00 | 0.05186 |
| 30.00 | 0.002088 | 90.00 | 0.02486 | 150.00 | 0.05634 |
| 40.00 | 0.00376 | 100.00 | 0.0303 | 160.00 | 0.05854 |

-continued

| DEGREES | AREA | DEGREES | AREA | DEGREES | AREA |
|---|---|---|---|---|---|
| 50.00 | 0.00578 | 110.00 | 0.03559 | 170.00 | 0.06066 |
|  |  |  |  | 180.00 | 0.06588 |

An analysis of the above table reveals that the area of the overlap increases as the valve assembly 30 is opened from a closed position at zero degrees to a fully opened position at one-hundred and eighty degrees. At the lower degrees positions, the narrow channel 188 is being moved into an overlapping position where small areas of the channel are opening gradually. The gradual opening of the passage 164, by virtue of the narrow channel 188, develops low but gradually increasing rates of water flow through the valve assembly 30. In conventional valve assemblies, undesirable noises such as a water "hammering" effect frequently occur when the valve is opened quickly. When the movable disk 44 is turned in a counterclockwise or a clockwise direction as viewed in FIG. 29, the narrow channels 172 and 188, respectively, facilitate the gradual increase in the rate of water flow even when the movable disc is turned quickly. This structure and action essentially precludes the occurrence of rapid changes in the rate of water flow and the undesirable noisy water "hammering" effect as the movable disk 44 is being opened, even where the movable disk is opened quickly. As the movable disk 44 is being turned so that the larger portion 274 of the passage 164 of the movable disk 44 begins to overlap with the passage 218 of the fixed disk 46, the increasing availability of the larger portion of the passage 164 lessens the opportunity for the noisy water "hammering" effect to occur.

As the larger portion 274 of the passage 164 of the movable disk 44 is uncovered and overlaps with the passage 218 of the fixed disk 46, the flow of water over the linking sections 176 and 186 tend to cause some turbulence of the water which could result in undesirable noise. Referring to FIGS. 15 and 16, the placement of the steps 206 and 208 adjacent the linking sections 176 and 186, respectively, face the flow of the water which tends to lessen the turbulence of the water as it enters the passage 164 in the vicinity of the linking sections. As shown in FIG. 16, the steps 206 and 208 are located about 0.025 inch from the bottom surface 162 of the movable disk 44. This structure and the water-flow reaction lessens the development of the undesirable noise. Referring to FIGS. 17, 18 and 19, the steps 210 and 212 are located adjacent the steps 208 and 206, respectively, at a distance of about 0.100 inch from the bottom surface 162 of the movable disk 44 and further enhance the anti-noise effect in conjunction with the steps 208 and 206.

In general, the above-identified embodiments are not to be construed as limiting the breadth of the present invention. Modifications, and other alternative constructions, will be apparent which are within the spirit and scope of the invention as defined in the appended claims.

What is claimed is:

1. A valve assembly, which comprises:
    a housing formed with an opening extending inward of the housing;
    a stem mounted within the opening of the housing for free rotation relative thereto;
    an enclosure element located within the opening of the housing between a wall of the opening and at least a portion of the stem to prevent engagement between the stem and the housing;
    the enclosure element is formed along an axis thereof from a first end to a second end thereof;
    the enclosure element is expandable along the axis thereof from the first end to the second end thereof;
    a first fluid-flow valve element coupled to the second end of the stem for rotation therewith and formed with an engagement surface;
    a second fluid-flow valve element fixedly attached within the opening of the housing and formed with an engagement surface which is in engagement with the engagement surface of the first fluid-flow valve element.

2. The valve assembly as set forth in claim 1, wherein the enclosure element is a bushing formed generally in the configuration of the opening of the housing.

3. The valve assembly as set forth in claim 2, wherein the configuration of the bushing is cylindrical.

4. The valve assembly as set forth in claim 1, wherein the enclosure element is expandable to conform to the size of the stem when the element is assembled with the stem.

5. The valve assembly as set forth in claim 1, wherein the enclosure element is formed with a slot which extends from the first end of the enclosure element to the second end thereof.

6. The valve assembly as set forth in claim 5, wherein the slot is formed in a slanted orientation from the first end to the second end of the enclosure element.

7. The valve assembly as set forth in claim 1, wherein the enclosure element is formed with a flange at one thereof which extends outward to engage an adjacent portion of the housing to locate the enclosure element relative to the housing.

8. The valve assembly as set forth in claim 1, which further comprises:
    a stop surface formed on the housing adjacent an entrance to the opening;
    a stop element assembled on the first end of the stem positioned for engagement with the stop surface of the housing to limit the turning distance of the stem and the first fluid-flow valve element; and
    structure formed on the stem and the stop element for removably retaining the stop with the stem.

9. The valve assembly as set forth in claim 5, which further comprises:
    a lubricant located on an inside wall and an outside wall of the enclosure element and in the slot thereof.

* * * * *